(12) United States Patent
Joffe et al.

(10) Patent No.: US 11,966,401 B2
(45) Date of Patent: Apr. 23, 2024

(54) QUERY TREE LABELING AND PROCESSING

(71) Applicant: ActionIQ, Inc., New York, NY (US)

(72) Inventors: Nitay Joffe, New Rochelle, NY (US); Brian O'Clair, South Orange, NJ (US)

(73) Assignee: ActionIQ, New York, NY (US)

( * ) Notice: Subject to any disclaimer, the term of this patent is extended or adjusted under 35 U.S.C. 154(b) by 246 days.

(21) Appl. No.: 17/133,859

(22) Filed: Dec. 24, 2020

(65) Prior Publication Data
US 2022/0207042 A1      Jun. 30, 2022

(51) Int. Cl.
*G06F 16/2455*      (2019.01)
*G06F 16/22*         (2019.01)
*G06F 16/2453*      (2019.01)

(52) U.S. Cl.
CPC .... *G06F 16/24558* (2019.01); *G06F 16/2246* (2019.01); *G06F 16/24539* (2019.01)

(58) Field of Classification Search
CPC ....... G06F 16/245558; G06F 16/24553; G06F 16/24539; G06F 16/02
See application file for complete search history.

(56) References Cited

U.S. PATENT DOCUMENTS

| | | | | |
|---|---|---|---|---|
| 6,341,281 B1 * | 1/2002 | MacNicol | ......... | G06F 16/24539 |
| 6,519,592 B1 * | 2/2003 | Getchius | ................ | G06Q 30/00 |
| | | | | 707/999.005 |
| 2011/0252199 A1 * | 10/2011 | Serrano | ............... | G06F 11/3476 |
| | | | | 711/E12.017 |
| 2012/0117438 A1 * | 5/2012 | Shaffer | .................. | H04L 1/1825 |
| | | | | 714/E11.131 |
| 2013/0179467 A1 * | 7/2013 | Ain | .................... | G06F 16/24539 |
| | | | | 707/771 |
| 2016/0330180 A1 * | 11/2016 | Egorov | .................... | G09C 1/00 |
| 2017/0111437 A1 * | 4/2017 | Shakir | .................... | H04L 67/10 |
| 2019/0318025 A1 | 10/2019 | Jindal | | |

(Continued)

FOREIGN PATENT DOCUMENTS

| | | | |
|---|---|---|---|
| CN | 105335402 | * | 2/2016 |
| EP | 4024226 | | 7/2022 |
| WO | 2016157191 A1 | | 10/2016 |

OTHER PUBLICATIONS

Extended European Search Report issued in App. No. EP21217413, dated Jun. 9, 2022, 13 pages.

(Continued)

*Primary Examiner* — Amanda L Willis
(74) *Attorney, Agent, or Firm* — Butzel Long

(57) ABSTRACT

Systems and techniques are provided for query tree labeling and processing. A query may be received. A query tree may be generated from the query and identifiers may be generated for nodes of the query tree and stored in the nodes. Labels may be stored in nodes determined to meet at least one criteria for being labeled nodes to generate a labeled query tree. The nodes of the labeled query tree may be processed by receiving results from an entry in a results data structure and returning the results from the entry as the results for the node if the identifier of the nodes matches the identifier of an entry in the results data structure. If there is no match, results may be computed for the node. The results generated by computing the node may be stored in the results data structure if the node has a label.

18 Claims, 21 Drawing Sheets

(56) References Cited

U.S. PATENT DOCUMENTS

2022/0075720 A1* 3/2022 Horie .................. G06F 12/0238
2024/0031394 A1* 1/2024 Parla .................. H04L 63/1433

OTHER PUBLICATIONS

Fabian Nagel et al: "Recycling in pipelined query evaluation", Data Engineering (ICDE), 2013 IEEE 29th International Conference on, IEEE, Apr. 8, 2013 (Apr. 8, 2013), pp. 338-349, XP032430877, DOI: 10.1109/ICDE.2013.6544837 ISBN: 978-1-4673-4909-3.

* cited by examiner

QUERY TREE LABELING AND PROCESSING

BACKGROUND

Recursive processing of query trees may be limited by the amount of memory available on a computing device, making recursive processing difficult to scale to large query trees. Graph database systems may be able to process large query trees, but may be inefficient and returning results from nodes in a query tree other than the root node. Other database systems may be able to efficiently process relational queries specified in a query tree, but may be limited to returning the result of the root node of the query tree.

BRIEF SUMMARY

According to implementations of the disclosed subject matter, a query may be received. A query tree may be generated from the query and identifiers may be generated for nodes of the query tree and stored in the nodes. Labels may be stored in nodes determined to meet at least one criteria for being labeled nodes to generate a labeled query tree. The nodes of the labeled query tree may be processed by receiving results from an entry in a results data structure and returning the results from the entry as the results for the node if the identifier of the nodes matches the identifier of an entry in the results data structure. If there is no match, results may be computed for the node. The results generated by computing the node may be stored in the results data structure if the node has a label.

Systems and techniques disclosed herein may allow for query tree labeling and processing. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
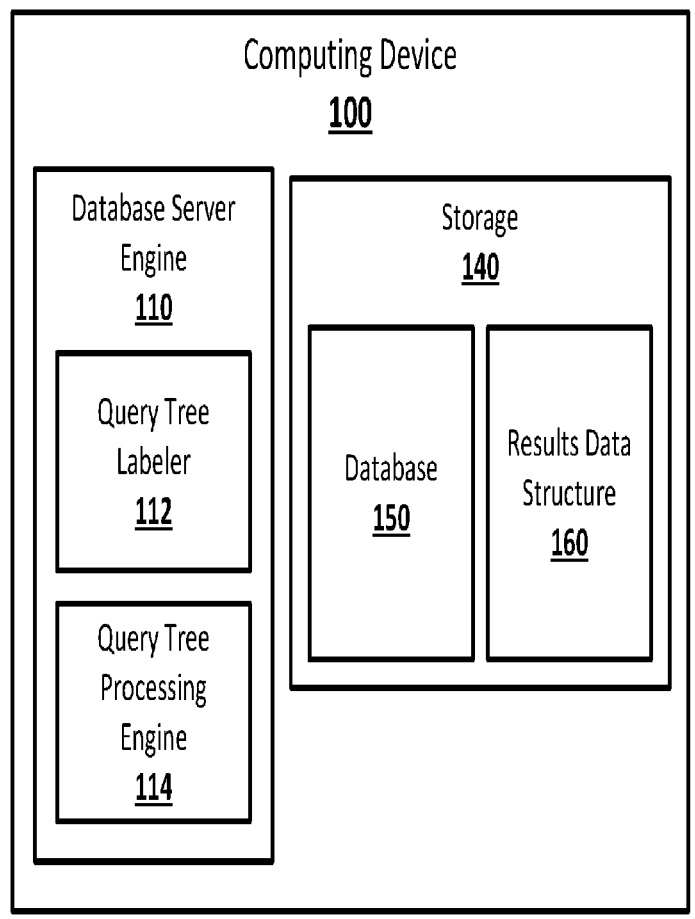
FIG. 1 shows an example system suitable for query tree labeling and processing according to an implementation of the disclosed subject matter.

According to embodiments disclosed herein, query tree labeling and processing may be used to label nodes of a query tree and efficiently process the query tree and returns results from nodes within the query tree other than the root node of the query tree. Each node in a directed acyclic graph, or query tree, may be assigned an identifier based on properties of the node, with some nodes having the same properties being assigned the same identifier. Nodes in the query tree may be labeled to identify nodes of interest. The query tree may be processed. During processing of the query tree, results from labeled nodes may be stored in a separate results data structure. The results from labeled nodes may be identified in the results data structure using the identifiers of the labeled nodes. As the query tree is processed, results for nodes with identifiers that match an identifier stored in the results data structure may be retrieved from the results data structure instead of through computation of the nodes. After the query tree is processed, results for any nodes of interest may be efficiently retrieved from the results data structure. This may allow for large query trees to be processed efficiently without scaling the execution space for the query tree, and for results to be stored and returned efficiently for any node of interest in the query tree, regardless of the depth in the query tree at which the node resides. The query tree may be a directed acyclic graph, and may or may not be a tree, as the query tree may include nodes that are child nodes of more than one node.

Each node in a directed acyclic graph, or query tree, may be assigned an identifier based on properties of the node, with some nodes having the same properties being assigned the same identifier. The query tree may be any suitable query tree stored in any suitable data structure and generated in any suitable manner, and may be a directed acyclic graph. For example, the query tree may be generated based on a query submitted by a user of a database system to be run against a database by a database server engine of the database system. The query tree may include any suitable number of nodes, and may have any suitable tree structure. Each node in the query tree may be assigned an identifier, for example, by the database server engine. The identifier assigned to a node may be based on properties of the node such that two nodes that are assigned the same identifier will produce the same results, although some nodes that produce the same results will not be assigned the same identifier, and two nodes that produce different results will never be assigned the same identifier. The identifier may be assigned through, for example, content or semantic hashing of the properties of the node. For example, the identifier for a leaf node of a query tree may be a hash of the value of the node. The value of a leaf node may be values, including numbers of any type in any format, such as integers or floating point numbers, characters or strings, or tuples or sets thereof, or may be a reference to data, such as to data stored in a database. The identifier for a non-leaf node may be based on a hash of properties of the child nodes of the node and on an operation of the non-leaf node. For example, a node for a union operation may be assigned an identifier based on applying an XOR operation to the child nodes of the node. The identifier assigned to a node in a query tree may be stored in any suitable manner, including as part of the data structure for the node within the data structure that stores the query tree.

Nodes in a query tree may be labeled to identify nodes of interest. The nodes of the query tree may be labeled, for example, by a database server engine, to identify nodes of interest within the query tree. Nodes of interest may include nodes that meet any suitable criteria, such as, for example, results nodes, high frequency nodes, nodes with many children, and nodes at or above a specified height within the query tree. Results nodes may be nodes for which the results of computing the nodes have been requested to be returned. The request may be, for example, part of the query that is used to generate the query tree. The query may include indications of sub-elements of the query that should be returned as results along with the results of the entire query. During generation of the query tree from the query tree, nodes that correspond to the sub-elements of the query that were indicated to be returned as results may be labeled as results nodes. In some implementations, after the query is received and used to generate a query tree, the query tree may be presented to a user who may identify nodes to be labeled as results nodes, for example, using a graphical user interface, or through input of the identifiers assigned to the nodes that should be labeled results nodes.

High frequency nodes may be groups of nodes in the query tree that appear a threshold number of times and have the same identifier assigned to them, indicating that they generate the same results when computed. For example, if a query tree includes six nodes that are all assigned the same identifier and a threshold value for high frequency nodes is four, then the six nodes with the same identifier may be labeled as high frequency nodes. High frequency nodes may be identified in any suitable manner. For example, during generation of a query tree, the number of nodes with assigned each specific identifier may be tracked. Once the generation of the query tree is complete, the query tree may be walked, and any node that has an identifier that was assigned to a number of greater than the threshold value for high frequency nodes may be labeled as a high frequency node. A query tree may have multiple groups of high frequency nodes. Nodes that belong to different groups of high frequency nodes may be given the same label, of being a high frequency node, as the label may not need to distinguish which group of a high frequency nodes any given node belongs to. The threshold value for high frequency nodes may be any suitable number, and may be chosen in any suitable manner, for example, based on the total number of nodes in the query tree.

Nodes with many children may be nodes that have a number of direct child nodes that exceeds a specified threshold for child nodes. For example, if a node in the query tree has eight child nodes and a threshold value for child nodes is six, then the node may be labeled a node with many children. A query tree may have any number of nodes labeled as nodes with many children. The threshold value for child nodes may be any suitable value, and may be based, for example, on the amount of memory, for example, volatile memory, needed to compute a node with a number of child nodes that is greater than the threshold value. For example, the threshold value may be set so that a node for a union operation that has a number of child nodes greater than the threshold value cannot have the values of its child nodes held in volatile memory at the same time while performing the union operation, while a node for a union operation that has a number of child nodes equal to or less than the threshold value can have the values of the its child nodes held in memory at the same time while performing the union operation. The threshold value may thus be based on the amount of available volatile memory on the computing device or system that will process the query tree and compute results for the nodes. Nodes with many children may be identified in any suitable manner. For example, during generation of a query tree, the number of child nodes for each node may be tracked, and nodes with many children may be labeled as such as soon as their number of child nodes exceeds the threshold value for the number of child nodes, or the query tree may be walked once the generation of the query tree is complete, with each node's number of children counted as part of the walking of the query tree and nodes that have a number of child nodes exceeding the threshold value for the number of child nodes being labeled as nodes with many children.

Nodes at or above a specified height within the query tree may be nodes that sit at specified levels of the query tree based on having a number of generations of nodes below it that is greater than a threshold value. For example, if a node in a query tree has six generations of nodes below it, and the threshold value for the number of generations below a node is five, the node may be labeled as a node at or above a specified height. The threshold value for the number of generations below a node may be any suitable value, and may be based, for example, on the how many node's results may be stored in volatile memory before needing to be moved out to make room for results from other nodes. For example, if results from five nodes will fit into volatile memory, the threshold number for generations below a node may be set to five, as a node that has more than five generations below it may not have results from generations below the fifth generation stored in volatile memory when the node is processed. The threshold value may thus be based on the amount of available volatile memory on the computing device or system that will process the query tree and compute results for the nodes. Nodes at or above a specified height may be identified in any suitable manner. For example, during generation of a query tree, the number of generations below each node may be tracked, and nodes at or above a specified height may be labeled as such as soon as the number of generations of nodes below them exceeds the threshold value for the number of generations below a node, or the query tree may be walked once the generation of the query tree is complete, with the number of generations below each node counted as part of the walking of the query tree and nodes that have a number of generations below them exceeding the threshold value for the number of generations below a node being labeled as nodes at or above a specified height.

The labels assigned to nodes of interest may be stored in any suitable manner. For example, the labels may be stored in the data structure for the nodes within the data structure for the query tree, or may be stored in a separate data structure that may index the labels according to the identifiers of the nodes the labels are assigned to. For example, an index may include a single entry for each label, with each entry including a list of identifiers for nodes that were assigned the label of the entry. In some implementations, the labels assigned to nodes of interest may be the same, and may not indicate why the node was assigned a label. For example, the label for a node with many children and the label for a node that is a high frequency node may be the same, as all labeled nodes may be treated in the same manner during the processing of the query tree regardless of the reason the node was labeled. In some implementations, only results nodes may have distinct labels that indicate that the nodes are results nodes, while nodes labeled for other reasons may have the same label.

The query tree may be processed. Once the query tree has had any nodes of interest labeled, the query tree may be processed in accordance with the nature of the query used to generate the query tree. For example, if the query used to generate the query tree was a database query intended to be run against a database, the query tree may be processed against the database by a database server engine. The query tree may be processed in any suitable manner, for example, with nodes of the query tree being processed in any suitable order, including, for example, based on a depth-first walk of the query tree. During processing of the query tree, results from labeled nodes may be stored in a separate results data structure. The results data structure may be stored in any suitable memory, including volatile and non-volatile memory. When a labeled node in the query tree is processed, the results data structure may be searched for the labeled node's identifier before the labeled node is computed. If the labeled node's identifier is already stored in the results data structure, then a labeled node with the same identifier, which may be the same labeled node that is being processed, has already been computed and had its results stored in the results data structure in association with the identifier for the labeled node. The results in the results data structure associated with the labeled node's identifier may be used as the results for the labeled node being processed without computing the labeled node. If the results data structure does not include the identifier for the labeled node, the labeled node may be computed in any suitable manner. If the labeled node is computed, the results from computing the labeled node may be stored in the results data structure in association with the identifier for the labeled node, so that the results may be used for any other labeled nodes in the query tree that have the same identifier as the labeled node, obviating the need to compute those other labeled nodes.

After the query tree is processed, results for any nodes of interest may be efficiently retrieved from the results data structure. The results data structure may store entries with the results of computing labeled nodes in association with the identifiers for those labeled nodes, with one entry for each unique identifier from among the identifiers assigned to labeled nodes. The identifier any node of interest, which may be the labeled nodes, may be used to retrieve results for that node of interest from the results data structure. This may include results for the root node of the query tree, for nodes labeled as results nodes based on input from a user, and nodes assigned labels for any other reason. This may allow for large query trees to be processed efficiently without scaling the execution space for the query tree, and for results to be stored and returned efficiently for any node of interest in the query tree, regardless of the depth in the query tree at which the node resides. The results data structure may be stored in any suitable memory for any suitable length of time. For example, the results data structure may be stored in non-volatile memory and may be used when processing additional query trees that may have nodes that are assigned the same identifier as nodes of interest from the query tree whose processing generated the results data structure.

FIG. 1 shows an example system suitable for query tree labeling and processing according to an implementation of the disclosed subject matter. A computing device 100 may include a database server engine 110 and storage 140. The computing device 100 may be any suitable device, such as, for example, a computer 20 as described in FIG. 8, for implementing the ingestion engine 110, the database server engine 120, and the storage 140. The computing device 100 may be a single computing device, or may include multiple connected computing devices, and may be, for example, a laptop, a desktop, an individual server, a server farm, or a distributed server system, or may be a virtual computing device or system. The computing device 100 may be part of a computing system and network infrastructure, or may be otherwise connected to the computing system and network infrastructure. The database server engine 110 may be any suitable combination of hardware and software for querying database tables that are in a format compatible with the database server engine 110, and may include a query tree labeler 112 and query tree processing engine 114. The storage 140 may be any suitable combination of hardware and software for implementing any suitable combination of volatile and non-volatile storage, which may store a database 150 and a results data structure 160.

The database server engine 120 may be any suitable combination of hardware and software for querying database tables that are in a format compatible with the database server engine 120, and may include the query tree labeler 112 and the query tree processing engine 114. The database server engine 120 may, for example, be any available database server engine, such as a MySQL or Apache Spark™ database server engine. The database server engine 120 may receive queries intended to be run against a database, such as the database 150. The query tree labeler 112 of the database server engine 110 may be any suitable combination of hardware and software that may generate a query tree from a received query, assign identifiers to the nodes of the query tree, and label nodes of interest in the query tree according to any suitable criteria and using any suitable threshold values. The query tree labeler 112 may be, for example, a component of the database server engine 110, or may be separate from the database server engine 110. The query tree labeler 112 may assign identifiers to the nodes of the query tree so that nodes that have the same identifier produce the same result when processed, and any two nodes that produce different results are not assigned the same identifier. The query tree labeler 112 may assign identifiers to nodes using any suitable operations and hash functions. The query tree labeler 112 may label nodes of interest in the query tree after, or concurrent with, assigning labels to the nodes of the query tree. The query tree labeler 112 may use any suitable criteria to determine which nodes of the query tree to label as nodes of interest, and label may any nodes of the query tree that meet any of the criteria used by the query tree labeler 112. For example, the query tree labeler 112 may label nodes that have an identifier that has been assigned to some threshold number of nodes in the query tree, nodes that are above a specified height in the query tree, nodes that have a number of children greater than a threshold value, and nodes that have been identified as results nodes by, for example, the query used to generate the query tree.

The query tree processing engine 114 may be any suitable combination of hardware and software that may process a query tree that includes labeled nodes of interest and in which the nodes have been assigned identifiers such that nodes with the same identifier produce the same results and nodes that produce different results do not have the same identifier. The query tree processing engine 114 may be a component of the database server engine 110, or may be separate from the database server engine 110. The query tree processing engine 114 may process a query tree to generate a result for the root node to be returned, for example, to a submitter of the query used to generate query tree. The query tree processing engine 114 may process a node in the query tree by first checking the results data structure 160 for the identifier of the node to determine a node with the same identifier has already been processed, and if so, using the results for the already-processed node in the results data structure 160 as the results for the node being processed. If a node with the same identifier has not already been processed, the query tree processing engine 114 may process the node, for example, receiving appropriate data for any leaf nodes that are children of the node from the database 150 and receiving results for non-leaf nodes that are children of the node from any suitable portion of the storage 140, for example, volatile memory, used to store the results of already-processed nodes that are being passed upwards in the processing of the query tree. If the node is labeled as a node of interest, the query tree processing engine 114 may store the identifier of the node and the results of processing the node in the results data structure 160.

The storage 140 may be any suitable combination of hardware and software for implementing any suitable combination of volatile and non-volatile storage, which may store a database 150 and a results data structure 160, connected to the computing device 100. For example, the storage 140 may include components of the computing device, such as a magnetic disks, flash memory modules or solid state disks, cache memory, random access memory, and other volatile memory, and may include components connected to the computing device 100 through any suitable wired or wireless connection. The storage 140 may include local storage, i.e., within the environment within which the computing device 100 operates, or may include components partially or entirely operated on a remote server. The storage 140 may store the database 150 and the results data structure 160. The database 150 may be any suitable database, including any suitable number of tables with any suitable number of entries in any suitable format. The database 150 may be in a format that is compatible with the database server engine 110. The results data structure 160 may store results and identifiers for labeled nodes of a query tree processed by the query tree processing engine 114. The results data structure 160 may be specific to an individual query tree, and each query tree processed by the query tree processing engine 114 may have its own separate results data structure in the storage 160. Results data structures, such as the results data structure 160, may be stored in non-volatile memory of the storage 140 for any suitable length of time after the query tree processing engine 114 has finished processing the query tree whose results are stored in the results data structure 160, even while results of processing non-labeled nodes in the query tree may be discarded, for example, after being passed up the query tree to be used in processing the parent nodes of the non-labeled nodes. The results data structure 160 may also be stored in volatile memory for any suitable length of time.

Figure 2A:
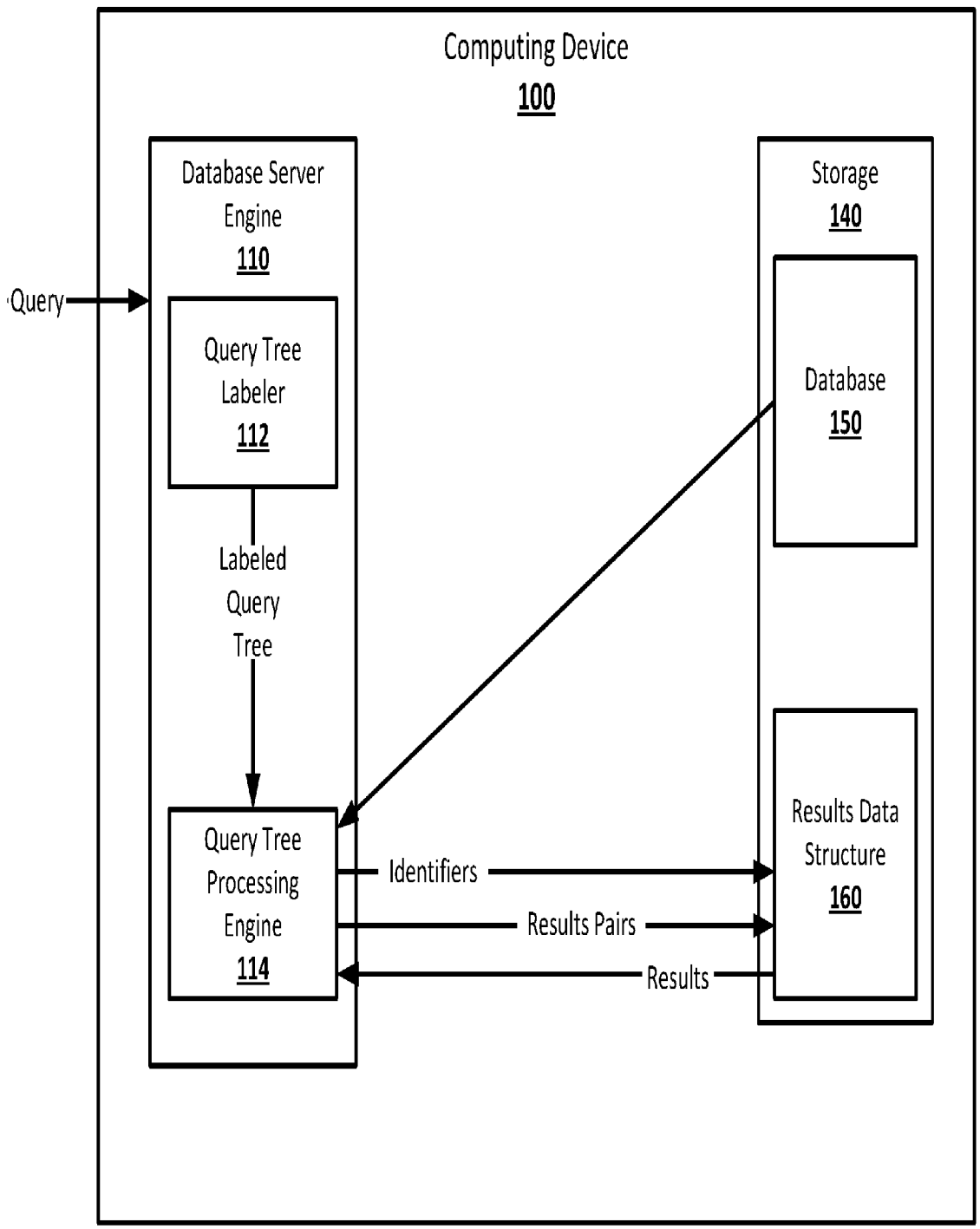
FIG. 2A shows an example arrangement suitable for query tree labeling and processing according to an implementation of the disclosed subject matter.

FIG. 2A shows an example arrangement suitable for query tree labeling and processing according to an implementation of the disclosed subject matter. A query may be received on the computing device 100 at the database server engine 110. The query may be received from any suitable source, including, for example a user, or from another component of the computing device 100 or other computing device. The query may be a query to be run against the database 150 written in a language used by the database server engine 110.

The query tree labeler 112 may generate a labeled query tree from the query. The query tree labeler 112 may generate a query tree from the query in any suitable manner. For example, references in the query to data from the database 150 may be represented as leaf nodes, while operations in the query may be arranged in the query tree such that the node representing an operation has child nodes that represent the inputs to the operation. The query tree labeler 112 may assign identifiers to the nodes of the query tree, for example, based on the operations of the nodes and the children of the nodes, such that any two nodes assigned the same identifier produce the same results and any two nodes that produce different results are assigned different identifiers. The query tree labeler 112 may, for example, assign leaf nodes identifiers based on the value of the data in the leaf nodes, for example, hashing the value which may be numbers, characters, strings, or sets thereof, or table, column, and row numbers that reference data stored in a table of a database, and may assign nodes that represent operations identifiers based on the operation and the identifiers of the nodes' child nodes. This may result in nodes that represent same operation and have the same child nodes having the same identifier. The identifier assigned to a node by the query tree labeler 112 may be written to the node as part of the data structure of the node, or may be associated with the node in any other suitable manner.

The query tree labeler 112 may label nodes of interest in the query tree to generate the labeled query tree. Nodes of interest may be any suitable nodes, determined according to any suitable criteria and subject to any suitable thresholds. For example, the query tree labeler 112 may label nodes for which results will be returned as results nodes. Results nodes may be specified in any suitable manner, including, for example, as part of the query received at the computing device 100. The root node of the query tree may always be labeled as a results node. The query tree labeler 112 may also, for example, label nodes that have an identifier that appears nodes of the query tree a number of times that is greater than a threshold value as high frequency nodes, label nodes that have a number of child nodes that is greater than a threshold value as nodes with many children, and label nodes that are at or above a specified height in the query tree as nodes at or above a specified height. The query tree labeler 112 may determine which nodes in the query tree to label in any suitable manner, and may label nodes at any time during the generation of the query tree, including during the initial generation of the query tree from the query and during and after the assigning of labels to nodes of the query tree. For example, the query tree labeler 112 may track the number of nodes with the same identifier when assigning identifiers to the nodes, or may walk the query tree after assigning the identifiers. The label given to a labeled node by the query tree labeler 112 may be written to the node as part of the data structure of the node, or may be associated with the node in any other suitable manner.

The labeled query tree may be sent from the query tree labeler 112 to the query tree processing engine 114 to be processed. The query tree processing engine 114 may receive the labeled query tree and process the labeled query tree in any suitable manner. The query tree processing engine 114 may process the labeled query tree depth-first, for example, starting with the deepest node representing an operation on the left side of the labeled query tree. To process a node representing an operation in the labeled query tree, the query tree processing engine 114 may first determine whether there is an entry in the results data structure 160 that includes the identifier assigned to the node. If there is such an entry in the results data structure 160, the query tree processing engine 114 may use the results from that entry as the results for the node being processed. If there is no such entry, the query tree processing engine 114 may process the node by performing the operation represented by the node. The query tree processing engine 114 may receive data from the database 150 for any leaf node that is a child node of the node being processed, and may use previously generated results for any node representing an operation that is a child node of the node being processed. The previously generated results may be stored, for example, in volatile memory of the computing device 100, and may be passed up from the processing of any node representing an operation that is a child node of the node being processed in any suitable manner, such as, for example, through parameters or return values of a recursive function of the query tree processing engine 114 used to walk the labeled query tree. After he query tree processing engine 114 processes a node representing an operation after that node's identifier was determined to not be in an entry in the results data structure 160, the query tree processing engine 114 may store the identifier assigned to the node and the results of processing the node as a results pair in an entry in the results data structure 160. The label for the node may also be stored in the entry, for example, in order to identify entries for nodes labeled as result nodes when results are returned. The query tree processing engine 114 may process each node representing an operation in the labeled query tree including the root node, the processing of which may generate the results for the query used to generate the labeled query tree.

Figure 2B:
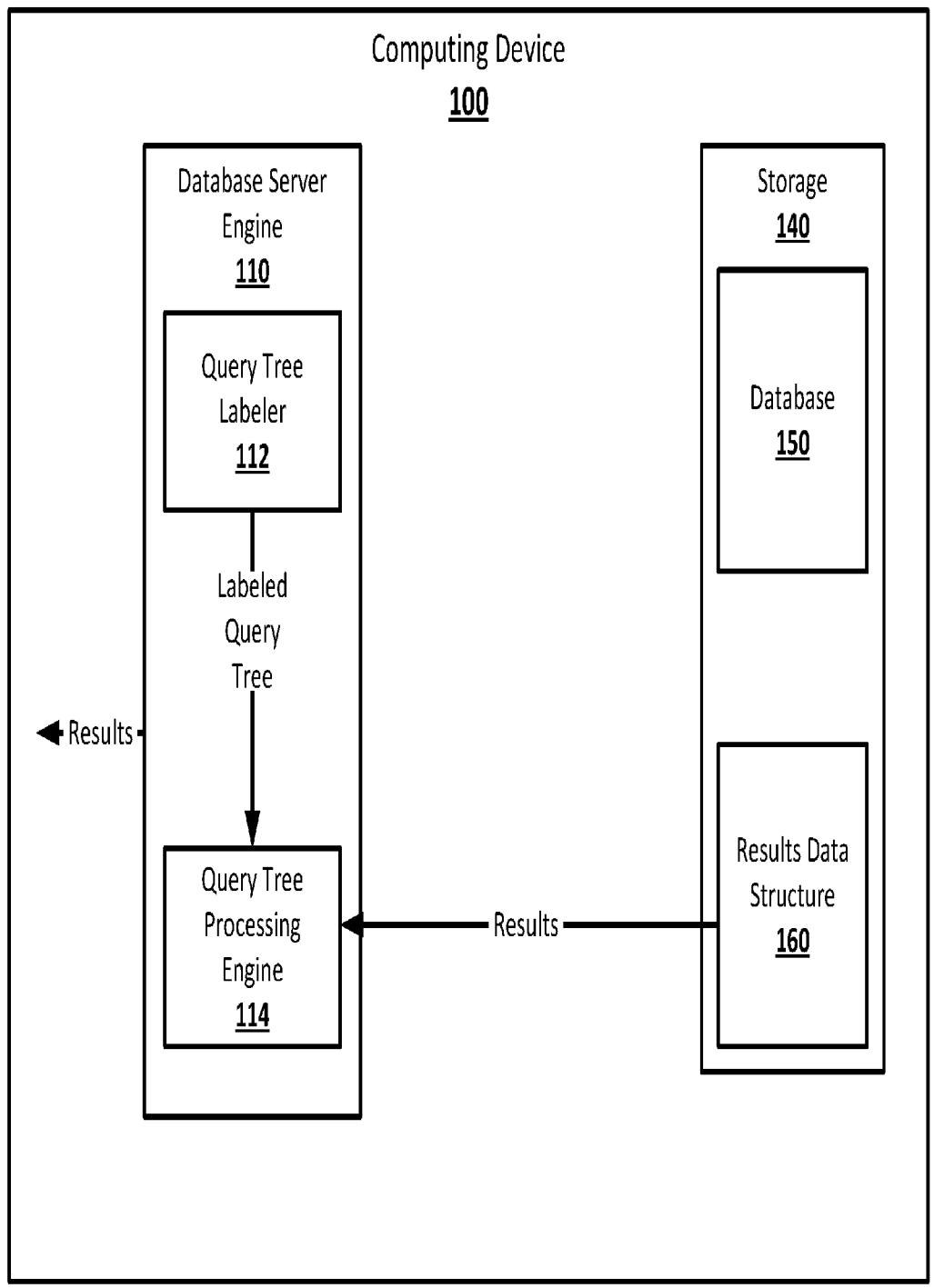
FIG. 2B shows an example arrangement suitable for query tree labeling and processing according to an implementation of the disclosed subject matter.

FIG. 2B shows an example arrangement suitable for query tree labeling and processing according to an implementation of the disclosed subject matter. The results of the query may be returned by the database server engine 110 in any suitable manner. For example, the results may be displayed to a user, written to a file, or transmitted to another process running on or component of the computing device 100, or to another computing device using any suitable network connection. The results may be returned for the root node of the labeled query tree, and for any node of the labeled query tree that was labeled as a result node. The results for the nodes labeled as results nodes may be returned from the results data structure 160. The database server engine 110 may identify entries for results nodes in the results data structure in any suitable manner. For example, the entries in the results data structure 160 for results node may be labeled as being entries for results nodes, or the database server engine 110 may walk the labeled query tree to retrieve identifiers assigned to nodes labeled as results as node and use those identifiers to identity the entries in the results data structure 160 for the results nodes.

After the results are returned, the results data structure 160 may remain stored in the storage 140. The results data structure 160 may be accessed again at any suitable time in order to retrieve results from the entries of the results data structure 160, and may be used in any suitable manner. For example, the results data structure 160 may be used to return a copy of the labeled query tree with results from the results data structure 160 inserted into the labeled nodes whose processing generated the results.

Figure 3:
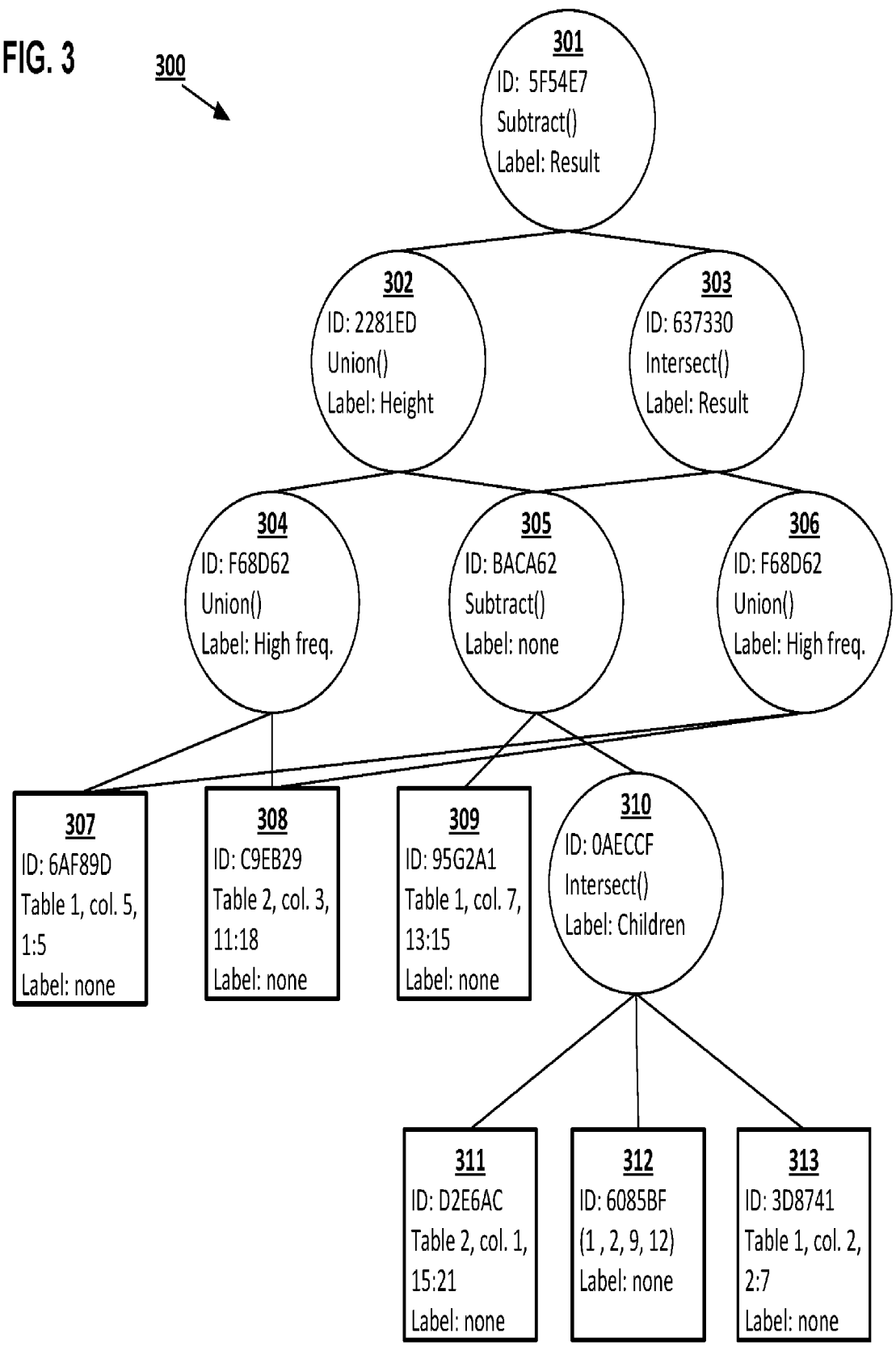
FIG. 3 shows an example visualization suitable for query tree labeling and processing according to an implementation of the disclosed subject matter.

FIG. 3 shows an example visualization of a query tree suitable for query tree labeling and processing according to an implementation of the disclosed subject matter. The query tree labeler 112 may generate a labeled query tree 300 from a query receive by the computing device 100 at the database server engine 110. The labeled query tree 300 may include, for example, 13 nodes, including operation nodes 301, 302, 303, 304, 305, 306, and 310, and leaf nodes 307, 308, 309, 311, 312, and 313. The operation node 301 may be the root node for the labeled query tree 300, and its child nodes may be the operation nodes 302 and 303. The child nodes of the operation node 303 may be the operation nodes 304 and 305. The child nodes for the operation nodes 303 may be the operation nodes 305 and 306. The child nodes for the operation node 304 may be the leaf nodes 307 and 308. The child nodes for the operation node 305 may be the leaf node 309 and the operation node 310. The child nodes for the operation node 306 may be the leaf nodes 307 and 308. The child nodes for the operation node 310 may be the leaf nodes 311, 312, and 313.

When generating the labeled query tree 300, the query tree labeler 112 may assign an identifier to each of the operation nodes 301, 302, 303, 304, 305, 306, and 310, and the leaf nodes 307, 308, 309, 311, 312, and 313. The identifier for the leaf nodes 307, 308, 309, 311, 312, and 313, may be assigned based on the value of each leaf node, for example, by applying any suitable hashing algorithm to the value of the leaf node. For example, the value of the leaf node 307 may be the data in Table 1, column 5, rows 1 through 5 of the database 150, which may have been specified in the query as the reference "Table 1, col. 5, 1:5". The query tree labeler 112 may generate an identifier for the leaf node 307 by hashing the string "Table 1, col. 5, 1:5", as stored in the leaf node 307 based on the query, hashing a string based on the reference in the query, or retrieving and hashing the data from the database 150 as specified by the reference, for example, the values stored in Table 1 of the database 150 from rows 1 to 5 of column 5. The query tree labeler 112 may store the generated identifier in the data structure for the leaf node 307, for example, in an "ID" field. The query tree labeler 112 may generate identifiers for every node of the labeled query tree 300 whose value is a reference to data in a database in the same manner and using the same algorithm. The value of the leaf node 312 may be the set of integers (1, 2, 9, 12), which may be specified directly in the query. The query tree labeler 112 may generate an identifier to assign to the leaf node 312 by hashing the set of integers (1, 2, 9, 12) and store the identifier in the "ID" field of the leaf node 312.

The query tree labeler 112 may generate and assign identifiers to operation nodes of the labeled query tree 300 based on the properties of the child nodes of the operation nodes and the operations represented by the operations nodes. For example, the query tree labeler 112 may generate an identifier to assign to the operation node 304 based on properties of the leaf nodes 307 and 308, including, for example, values and identifiers, and the operation represented by the operation nodes 304, which may be a union operation. The query tree labeler 112 may, for example, concatenate the identifiers of the leaf nodes 307 and 308 with characters representing the union operation, and then hash the string resulting from the concatenation. The query tree labeler 112 may, alternatively, use an XOR operation on the values of the leaf nodes 307 and 308, with the use of the XOR operation being based on the operation node 304 representing a union operation, and with other logical operations being used when identifiers are generated for operation nodes that represent other operations. The query tree labeler 112 may store the generated identifier in the data structure for the operation node 304, for example, in an "ID" field. The query tree labeler 112 may generate identifiers for every operation node in the labeled query tree 300 in a similar manner, such that operation nodes that are assigned the same identifier will produce the same result when processed, and operation nodes that produce different results are assigned different identifiers. This does not preclude operation nodes that produce the same result from being assigned different identifiers, if, for example, they have child nodes with different properties or represent different operations. The query tree labeler 112 may use the same hashing algorithm for generating identifiers for every node of the labeled query tree 112, whether the node is a leaf node that directly specifies a value or includes a reference to the value for the leaf node, or is operation node.

After, or concurrent with, constructing the structure for the labeled query tree 300 and generating and assigning identifiers to the nodes of the labeled query tree 300, the query tree labeler 112 may label the nodes of the query tree 300. The query tree labeler 112 may determine which nodes to label as results nodes based on specifications made in the query. For example, the query may specify the "Intersect( )" operation that is represented in the operation node 303 should be a result node, as the writer of the query wants the result of the "Intersect( )" operation returned after the query is run against the database 150. The query tree labeler 112 may also determine which nodes should be labeled as results node based on input, for example, from a user, after displaying the query tree to the user before the query tree is labeled. The query tree labeler 112 may also use any other suitable criteria to the label the nodes of the labeled query tree 300. For example, the threshold value for labeling a node as a high frequency node based on the number of times the node's identifier appears in the labeled query tree 300 may be one. The query tree labeler 112 may label the operation nodes 304 and 306 as high frequency nodes, as they may have been assigned the same identifier, resulting in more than one node in the labeled query tree 300 having that identifier, greater than the threshold value of one. The threshold value for labeling a node as a node with many children may be two. The query tree labeler 112 may label the operation node 310 as a node with many children, as the operation node 310 may have three child nodes, greater than the threshold value of two. The threshold value for labeling a node as a node at or above a specified height may be two. The query tree labeler 112 may label the operation node 302 as a node at or above a specified height, as the operation node 302 may have three generations below it, greater than the threshold value of two. The query tree labeler 112 may also label the operation nodes 301 and 303 as nodes at or above a specified height, though these nodes may already be labeled as results nodes based on the operation node 301 being the root node and the operation node 303 being specified as a result node in the query, and it may be unnecessary to label an already labeled node.

Figure 4A:
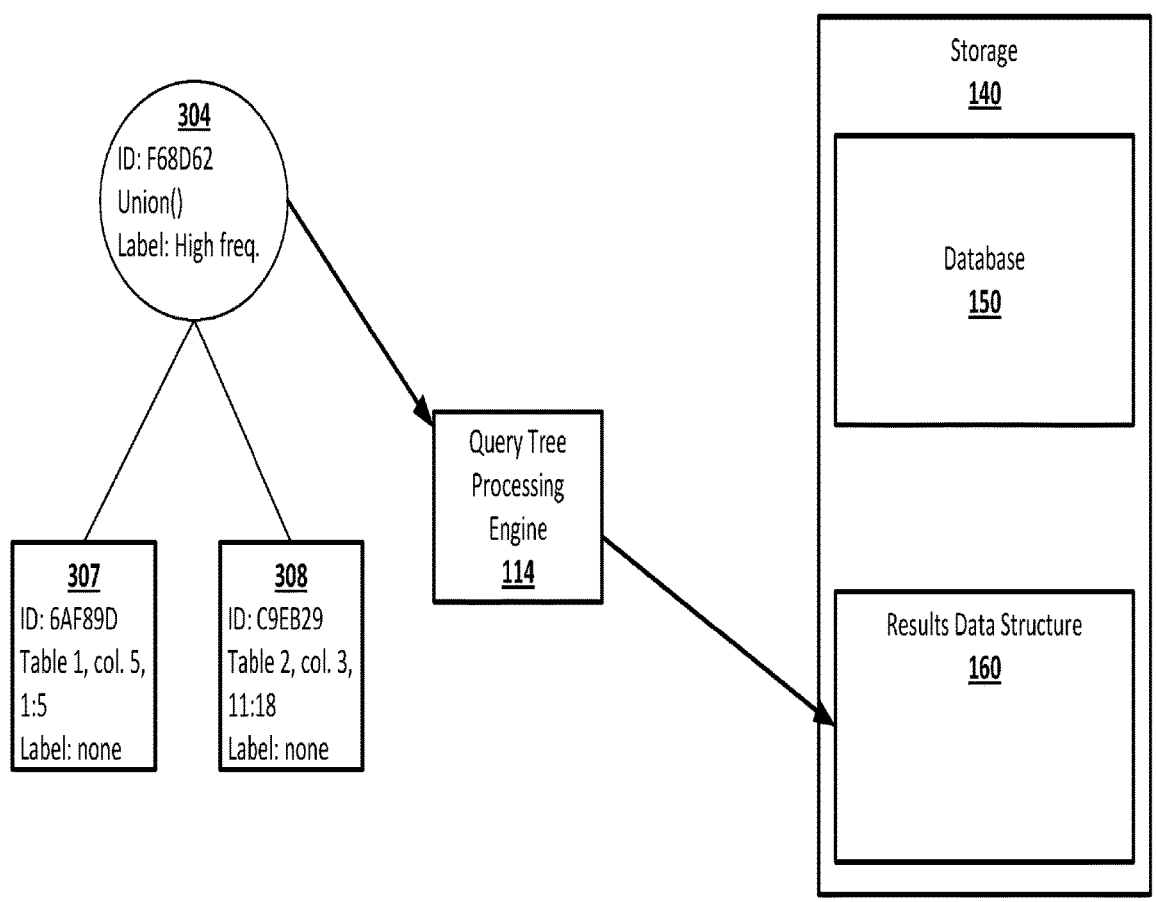
FIG. 4A shows an example arrangement suitable for query tree labeling and processing according to an implementation of the disclosed subject matter.

FIG. 4A shows an example arrangement suitable for query tree labeling and processing according to an implementation of the disclosed subject matter. After the labeled query tree 300 is generated and has nodes assigned identifiers and labeled by the query tree labeler 112, the labeled query tree 300 may be processed by the query processing engine 114. Processing the labeled query tree 300 may implement the running of the query receiving at the computing device 100 against the database 150.

The query tree processing engine 114 may process the labeled query tree 300 depth first. For example, the query tree processing engine 114 may start processing the labeled query tree 300 at the deepest left-most operation node, which may be the operation node 304. The query tree processing engine 114 may first check the results data structure 160 to determine if there is an entry in the results data structure 160 with the same identifier as the operation node 304, and may determine that there is no such entry in the results data structure 160.

Figure 4B:
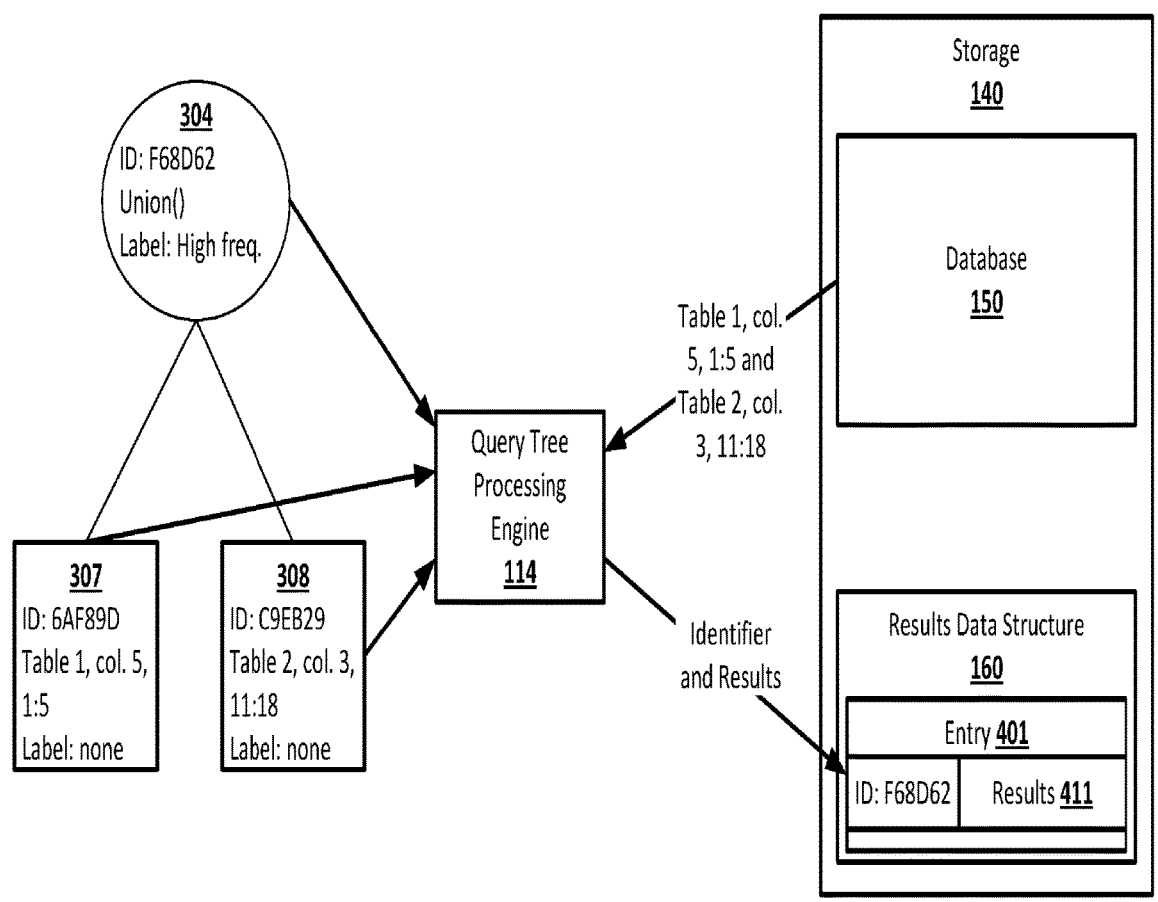
FIG. 4B shows an example arrangement suitable for query tree labeling and processing according to an implementation of the disclosed subject matter.

FIG. 4B shows an example arrangement suitable for query tree labeling and processing according to an implementation of the disclosed subject matter. The query tree processing engine 114, having determined that there is no entry in the results data structure 160 with the same identifier as the operation node 304, may process the operation node 304 to generate results for the operation node 304. The query tree processing engine 114 may perform the union operation represented by the operation node 304 on the values of the child nodes of the operation nodes 304, the leaf nodes 307 and 308. The query tree processing engine 114 may use the references in the leaf nodes 307 and 308 to receive data for the values of the leaf nodes 307 and 308 from the database 150 and perform the union operation on the data received from the database 150.

The operation node 304 may have a label indicating that it is a node of interest, for example, a high frequency node. This may cause the query processing engine 114 to store the results of processing the operation node 304 in the results data structure 160. For example, the query processing engine 114 may store an entry 401 in the results data structure 160. The entry 401 may include a results pair of the identifier of the operation node 304 and results 411 generated by the processing of the operation node 304, for example, the performance of the union operation on the values of the leaf nodes 307 and 308.

Figure 4C:
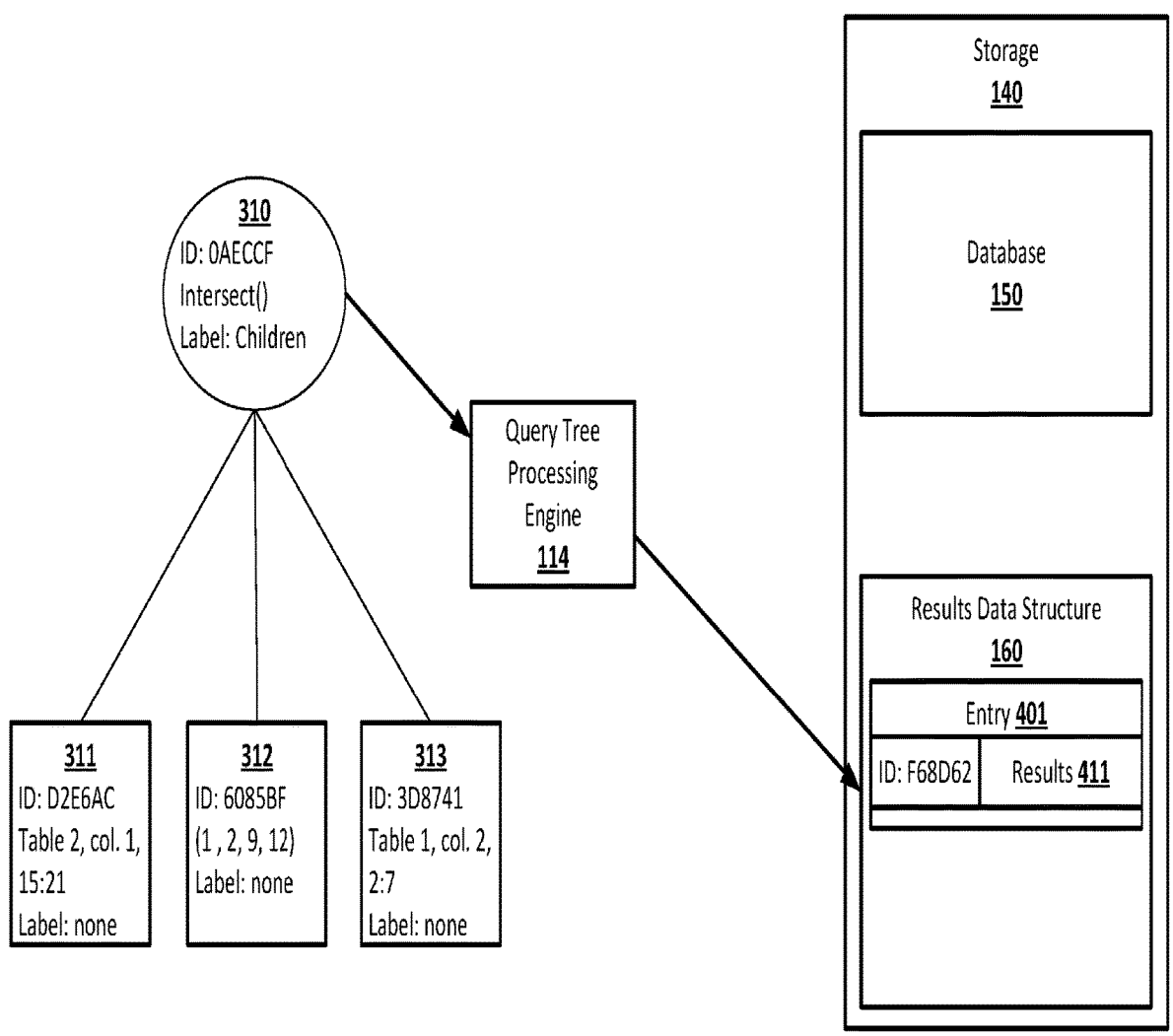
FIG. 4C shows an example arrangement suitable for query tree labeling and processing according to an implementation of the disclosed subject matter.

FIG. 4C shows an example arrangement suitable for query tree labeling and processing according to an implementation of the disclosed subject matter. After processing the operation node 304, the query tree processing engine 114 may continue the depth-first processing of the labeled query tree 300 by processing the operation node 310. The query tree processing engine 114 may first check the results data structure 160 to determine if there is an entry in the results data structure 160 with the same identifier as the operation node 310, and may determine that there is no such entry in the results data structure 160.

Figure 4D:
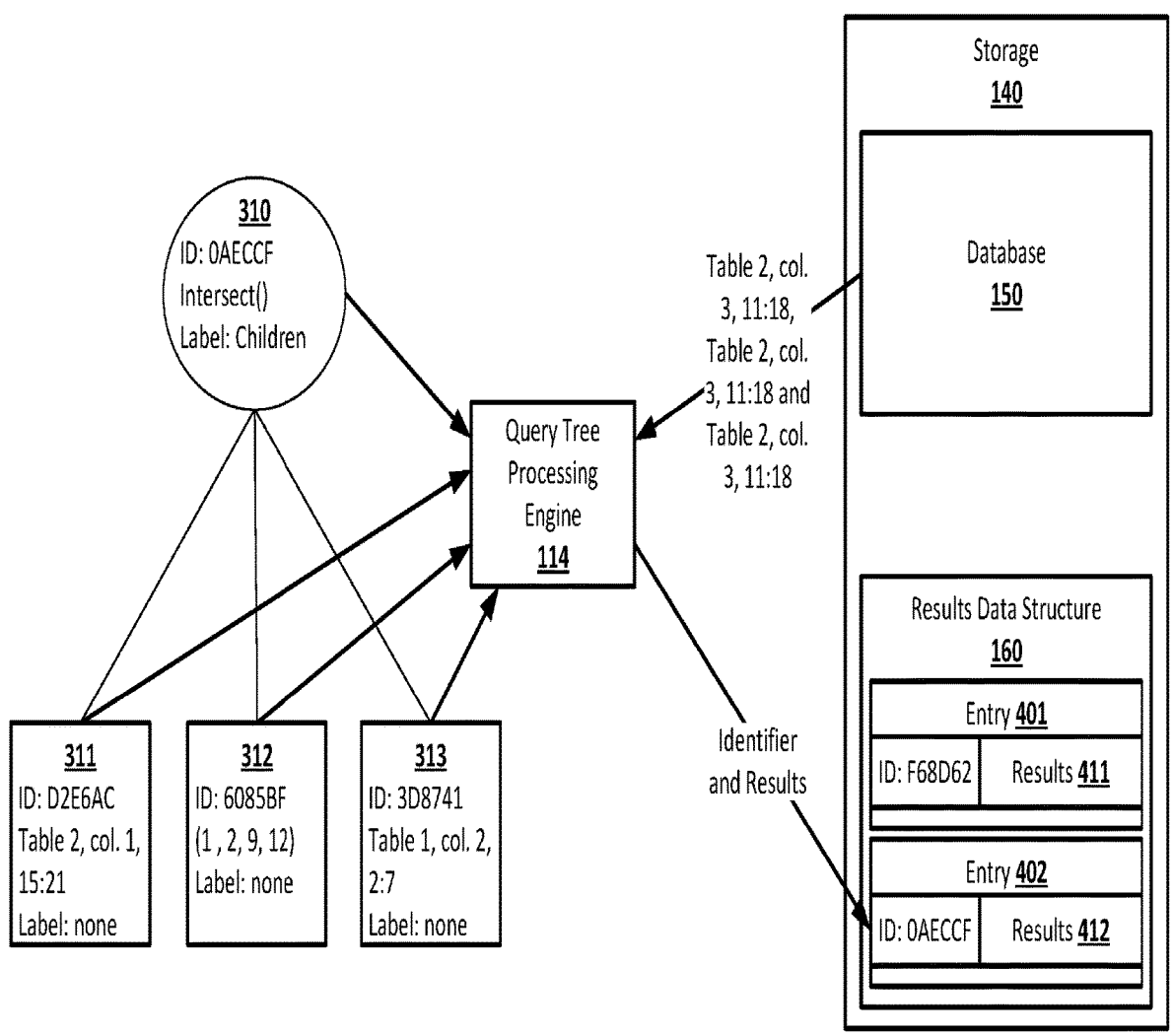
FIG. 4D shows an example arrangement suitable for query tree labeling and processing according to an implementation of the disclosed subject matter.

FIG. 4D shows an example arrangement suitable for query tree labeling and processing according to an implementation of the disclosed subject matter. The query tree processing engine 114, having determined that there is no entry in the results data structure 160 with the same identifier as the operation node 310, may process the operation node 310 to generate results for the operation node 310. The query tree processing engine 114 may perform the intersect operation represented by the operation node 310 on the values of the child nodes of the operation nodes 310, the leaf nodes 311, 312, and 313. The query tree processing engine 114 may use the references in the leaf nodes 311 and 313 to receive data for the values of the leaf nodes 311 and 313 from the database 150 and perform the intersect operation on the data received from the database 150 and the value from the leaf node 312.

The operation node 310 may have a label indicating that it is a node of interest, for example, a node with many children. This may cause the query processing engine 114 to store the results of processing the operation node 310 in the results data structure 160. For example, the query processing engine 114 may store an entry 402 in the results data structure 160. The entry 402 may include a results pair of the identifier of the operation node 310 and results 412 generated by the processing of the operation node 310, for example, the performance of the intersect operation on the values of the leaf nodes 311, 312, and 313.

Figure 4E:
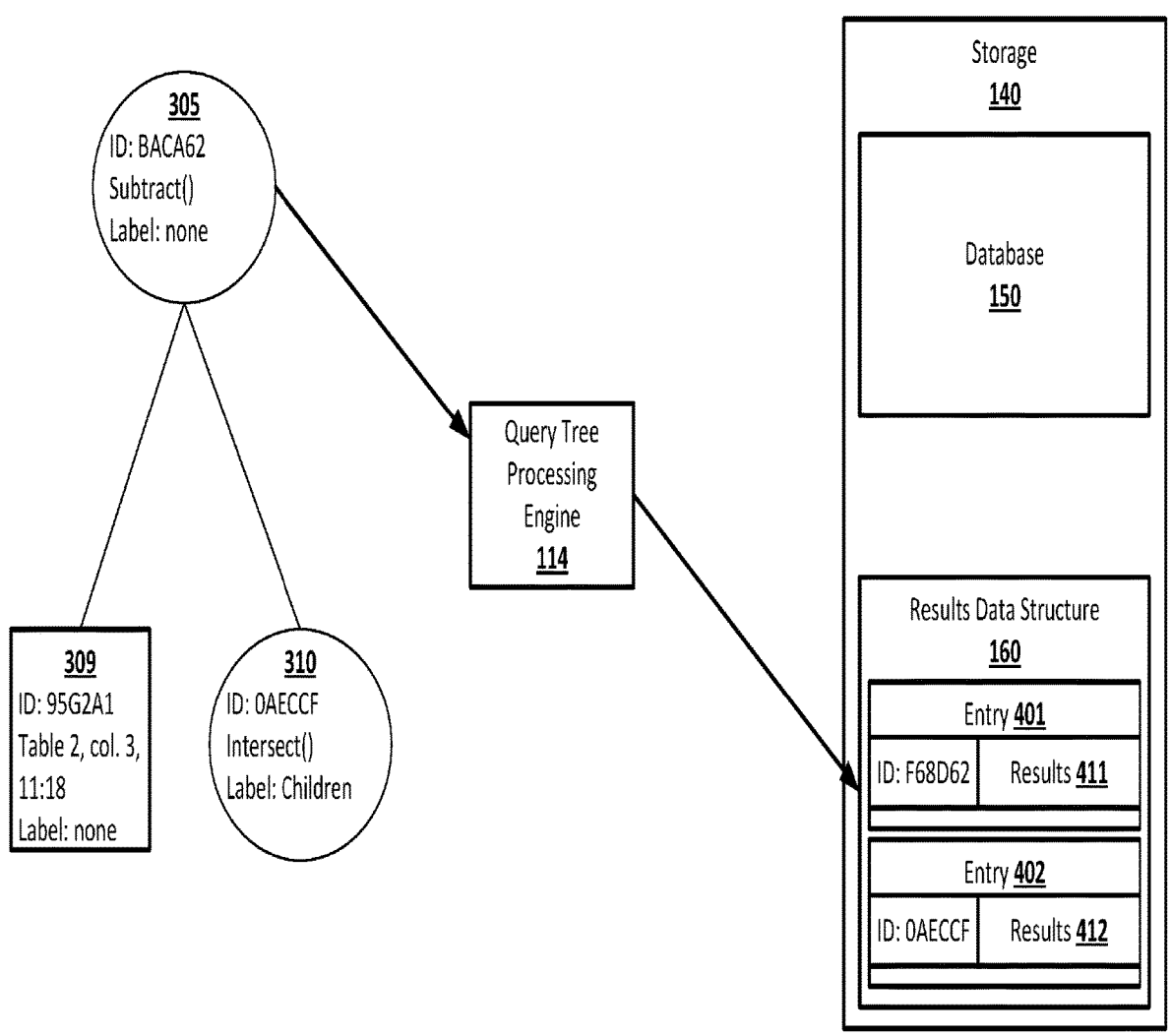
FIG. 4E shows an example arrangement suitable for query tree labeling and processing according to an implementation of the disclosed subject matter.

FIG. 4E shows an example arrangement suitable for query tree labeling and processing according to an implementation of the disclosed subject matter. After processing the operation node 310, the query tree processing engine 114 may continue the depth-first processing of the labeled query tree 300 by processing the operation node 305. The query tree processing engine 114 may first check the results data structure 160 to determine if there is an entry in the results data structure 160 with the same identifier as the operation node 305, and may determine that there is no such entry in the results data structure 160.

Figure 4F:
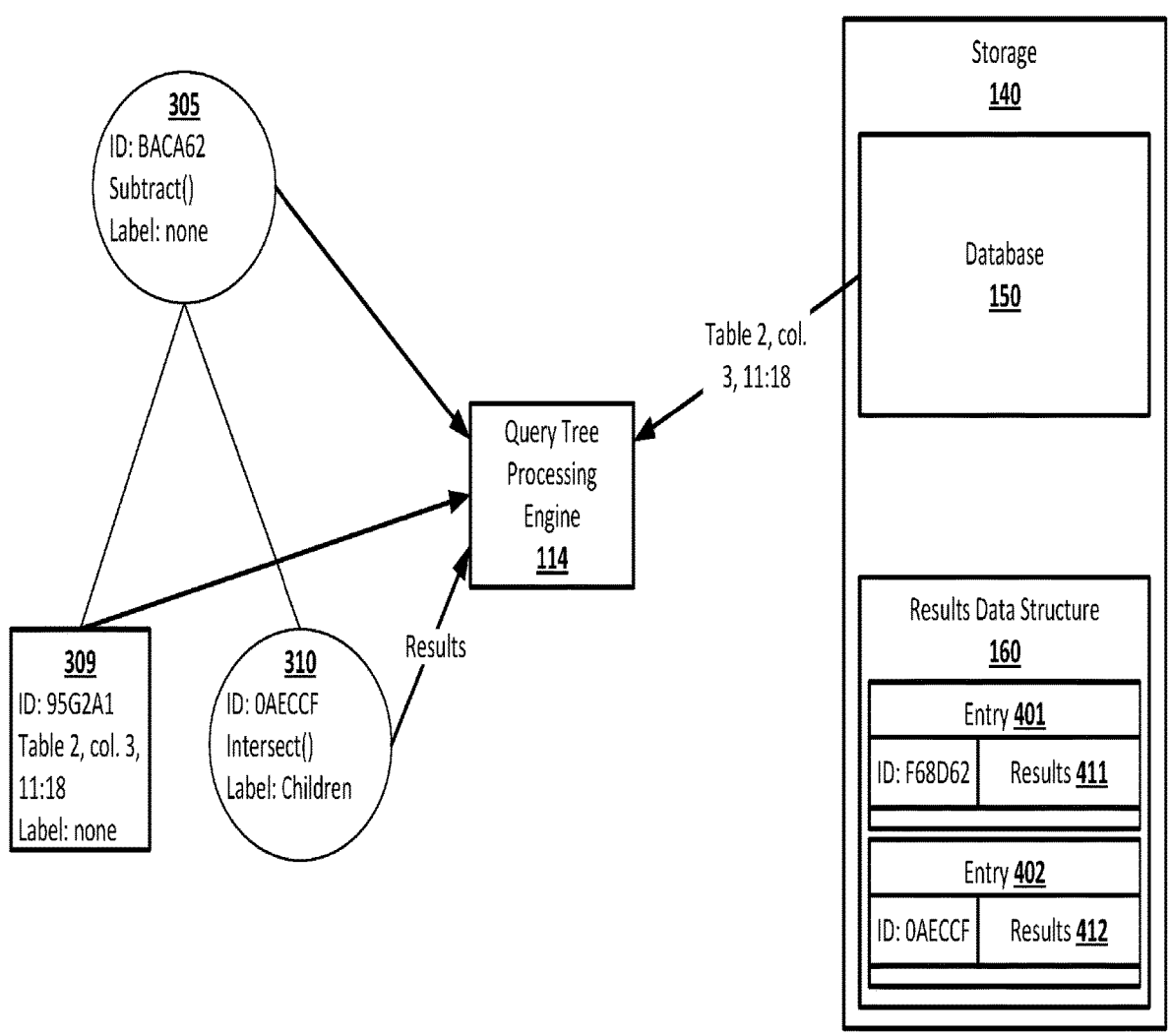
FIG. 4F shows an example arrangement suitable for query tree labeling and processing according to an implementation of the disclosed subject matter.

FIG. 4F shows an example arrangement suitable for query tree labeling and processing according to an implementation of the disclosed subject matter. The query tree processing engine 114, having determined that there is no entry in the results data structure 160 with the same identifier as the operation node 305, may process the operation node 305 to generate results for the operation node 305. The query tree processing engine 114 may perform the subtract operation represented by the operation node 305 on the values of the child nodes of the operation nodes 305, the leaf node 309 and the operation node 310. The query tree processing engine 114 may use the reference in the leaf nodes 309 to receive data for the values of the leaf node 309 from the database 150 and perform the subtract operation on the data received from the database 150 and value of the operation node 310, which may be returned upwards from the processing of the operation node 310 by the query tree processing engine 114.

The operation node 305 may not have a label indicating that it is a node of interest. This may cause the query processing engine 114 to not store the results of processing the operation node 305 in the results data structure 160. The results of processing the operation node 305 may still be returned upwards to be used in processing the parent nodes of the operation node 305.

Figure 4G:
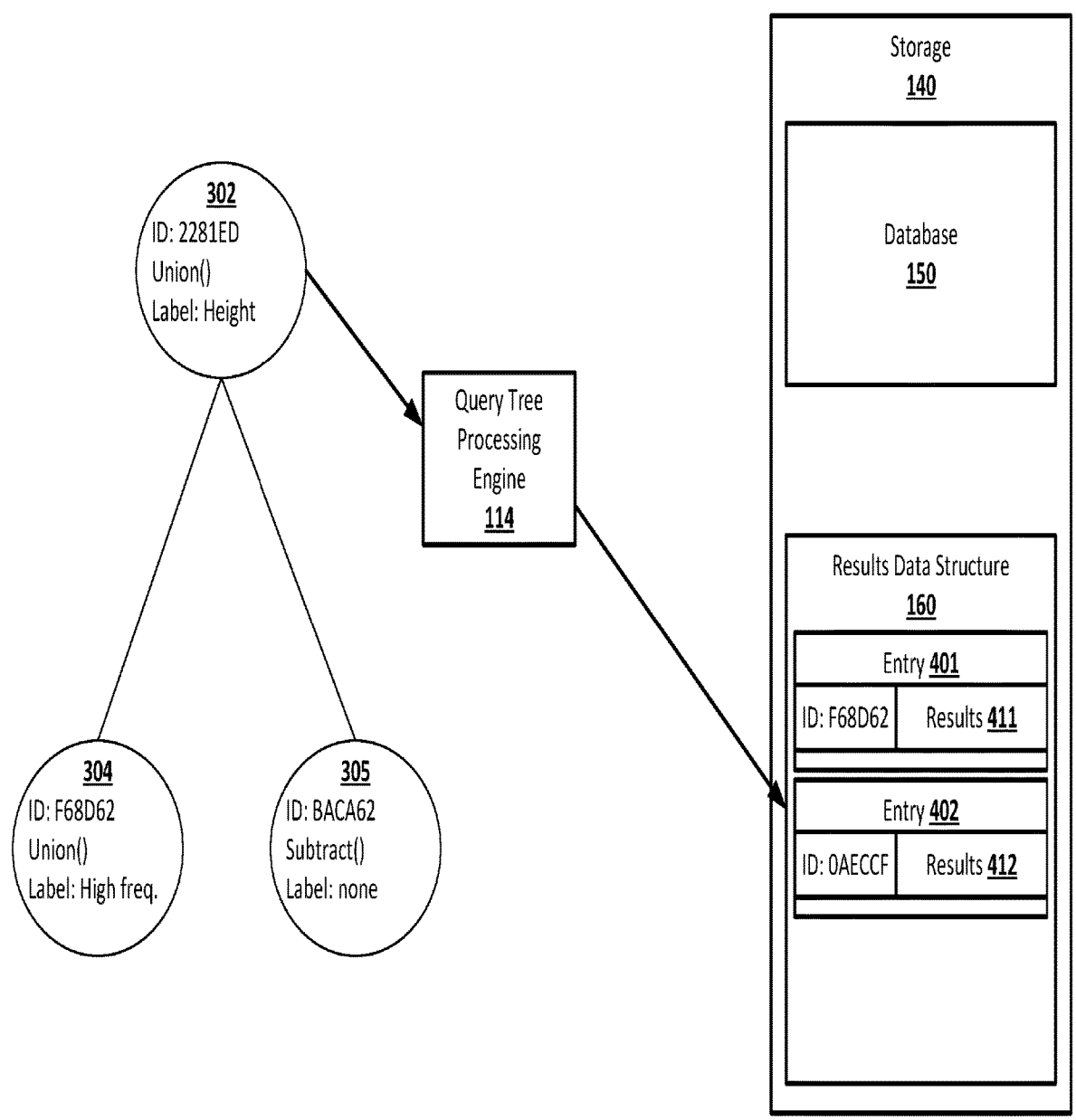
FIG. 4G shows an example arrangement suitable for query tree labeling and processing according to an implementation of the disclosed subject matter.

FIG. 4G shows an example arrangement suitable for query tree labeling and processing according to an implementation of the disclosed subject matter. After processing the operation node 305, the query tree processing engine 114 may continue the depth-first processing of the labeled query tree 300 by processing the operation node 302. The query tree processing engine 114 may first check the results data structure 160 to determine if there is an entry in the results data structure 160 with the same identifier as the operation node 302, and may determine that there is no such entry in the results data structure 160.

Figure 4H:
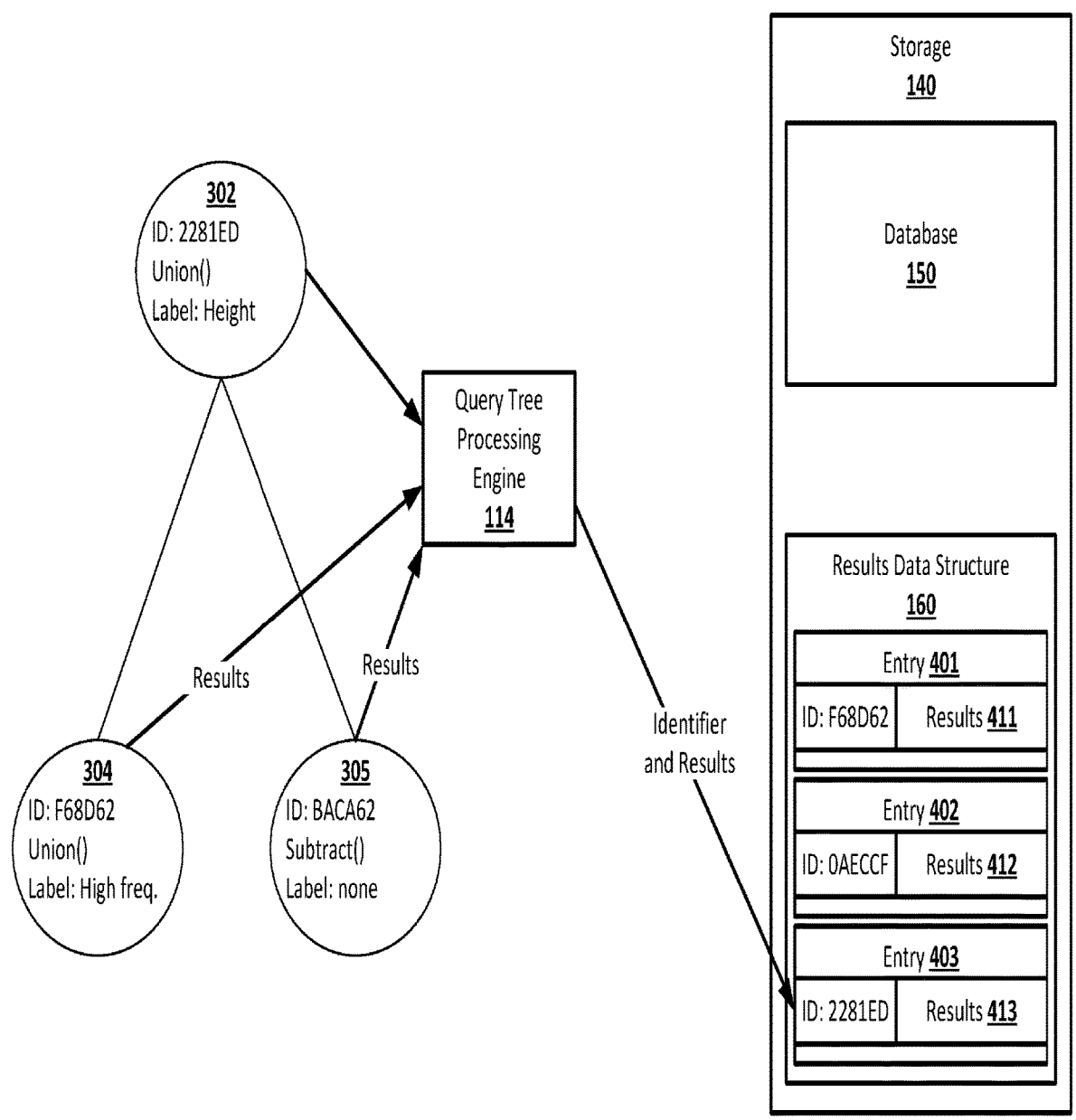
FIG. 4H shows an example arrangement suitable for query tree labeling and processing according to an implementation of the disclosed subject matter.

FIG. 4H shows an example arrangement suitable for query tree labeling and processing according to an implementation of the disclosed subject matter. The query tree processing engine 114, having determined that there is no entry in the results data structure 160 with the same identifier as the operation node 302, may process the operation node 302 to generate results for the operation node 302. The query tree processing engine 114 may perform the union operation represented by the operation node 302 on the values of the child nodes of the operation nodes 302, the operation nodes 304 and 305. The query tree processing engine 114 may perform the union operation on the values of the operation nodes 304 and 305, which may be returned upwards from the processing of the operation nodes 304 and 305.

The operation node 302 may have a label indicating that it is a node of interest, for example, a node at or above a specified height. This may cause the query processing engine 114 to store the results of processing the operation node 302 in the results data structure 160. For example, the query processing engine 114 may store an entry 403 in the results data structure 160. The entry 403 may include a results pair of the identifier of the operation node 302 and results 413 generated by the processing of the operation node 302, for example, the performance of the union operation on the values of the operation nodes 304 and 305.

Figure 4I:
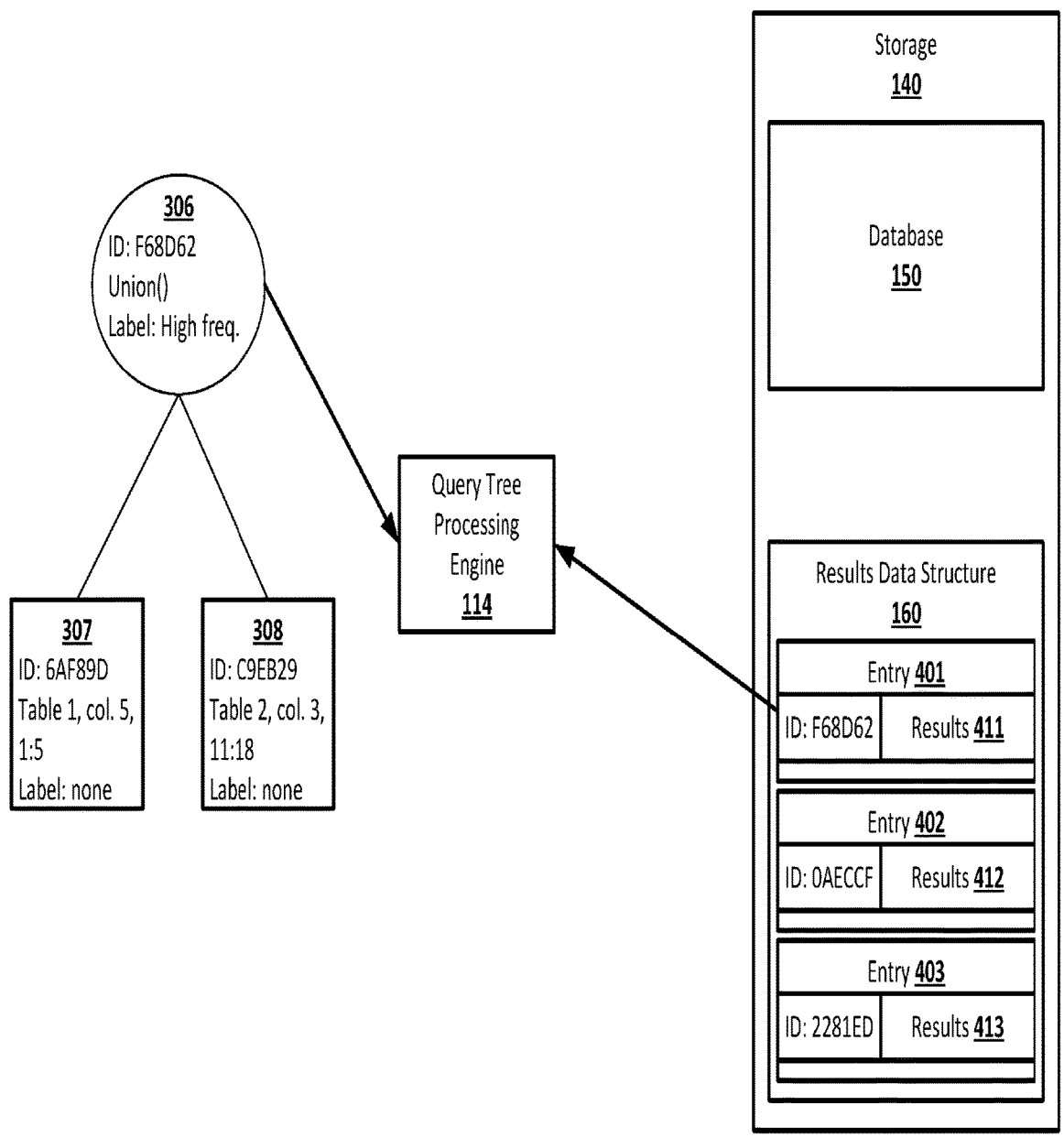
FIG. 4I shows an example arrangement suitable for query tree labeling and processing according to an implementation of the disclosed subject matter.

FIG. 4I shows an example arrangement suitable for query tree labeling and processing according to an implementation of the disclosed subject matter. After processing the operation node 302, the query tree processing engine 114 may continue the depth-first processing of the labeled query tree 300 by processing the operation node 306. The query tree processing engine 114 may first check the results data structure 160 to determine if there is an entry in the results data structure 160 with the same identifier as the operation node 302, and may determine that the entry 401 includes the identifier of the operation node 302. Instead of performing the union operation represented by the operation node 306, the query tree processing engine 114 may receive the results 411 from the entry 401 of the results data structure 160. The results 411 may be used by the query tree processing engine 114 as the results of processing the operation node 306, for example, being passed upwards to be used as the value of the operation node 306 when processing any parent node of the operation node 306. This may, for example, allow the query tree processing engine 114 to avoid using computational time and resources performing the union operation represented by the operation node 306, including avoiding the need to receive data for the leaf nodes 307 and 308 from the database 150 based on the references in the leaf nodes 307 and 308.

Figure 4J:
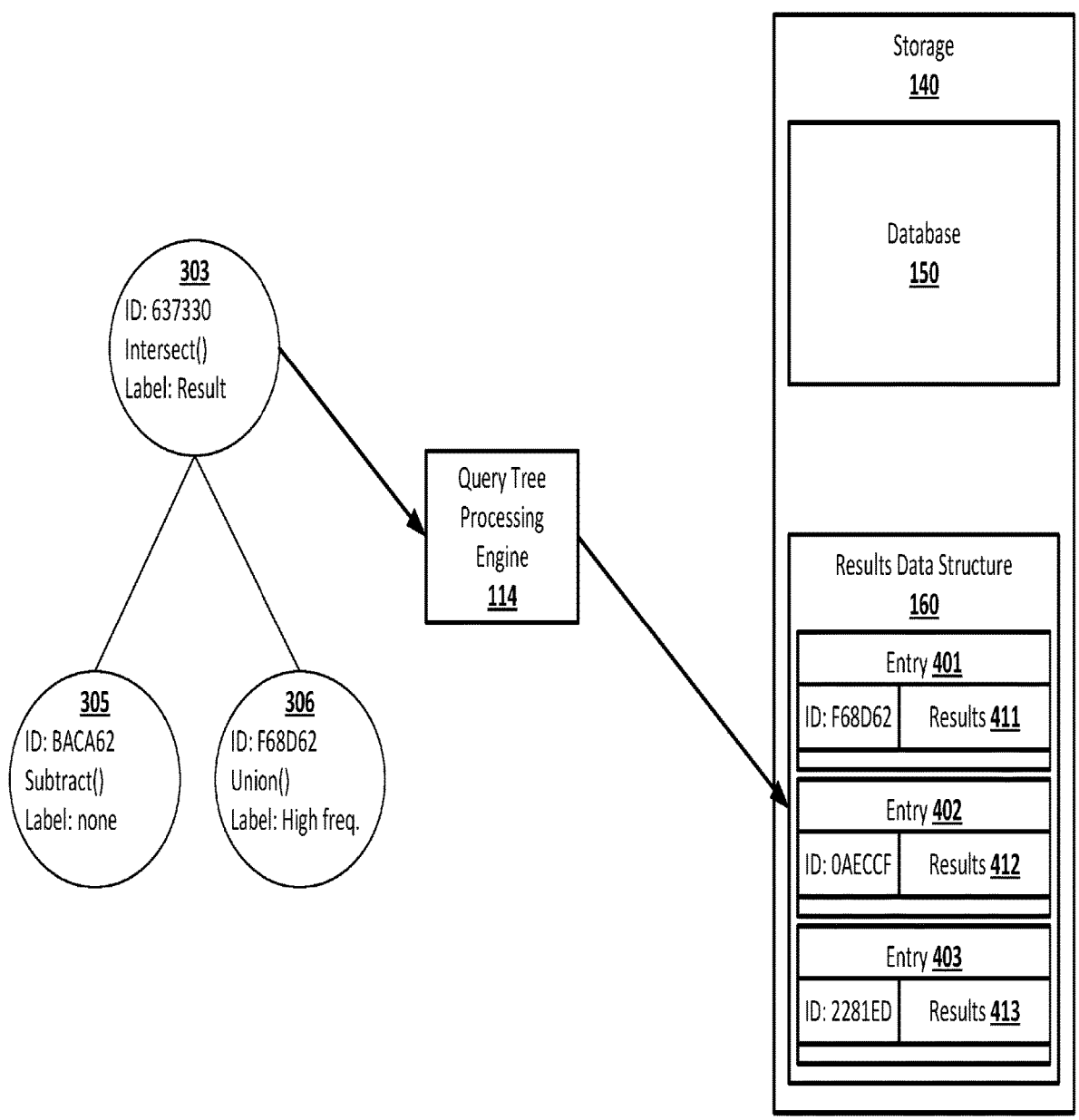
FIG. 4J shows an example arrangement suitable for query tree labeling and processing according to an implementation of the disclosed subject matter.

FIG. 4J shows an example arrangement suitable for query tree labeling and processing according to an implementation of the disclosed subject matter. After processing the operation node 306, the query tree processing engine 114 may continue the depth-first processing of the labeled query tree 300 by processing the operation node 303. The query tree processing engine 114 may first check the results data structure 160 to determine if there is an entry in the results data structure 160 with the same identifier as the operation node 303, and may determine that there is no such entry in the results data structure 160.

Figure 4K:
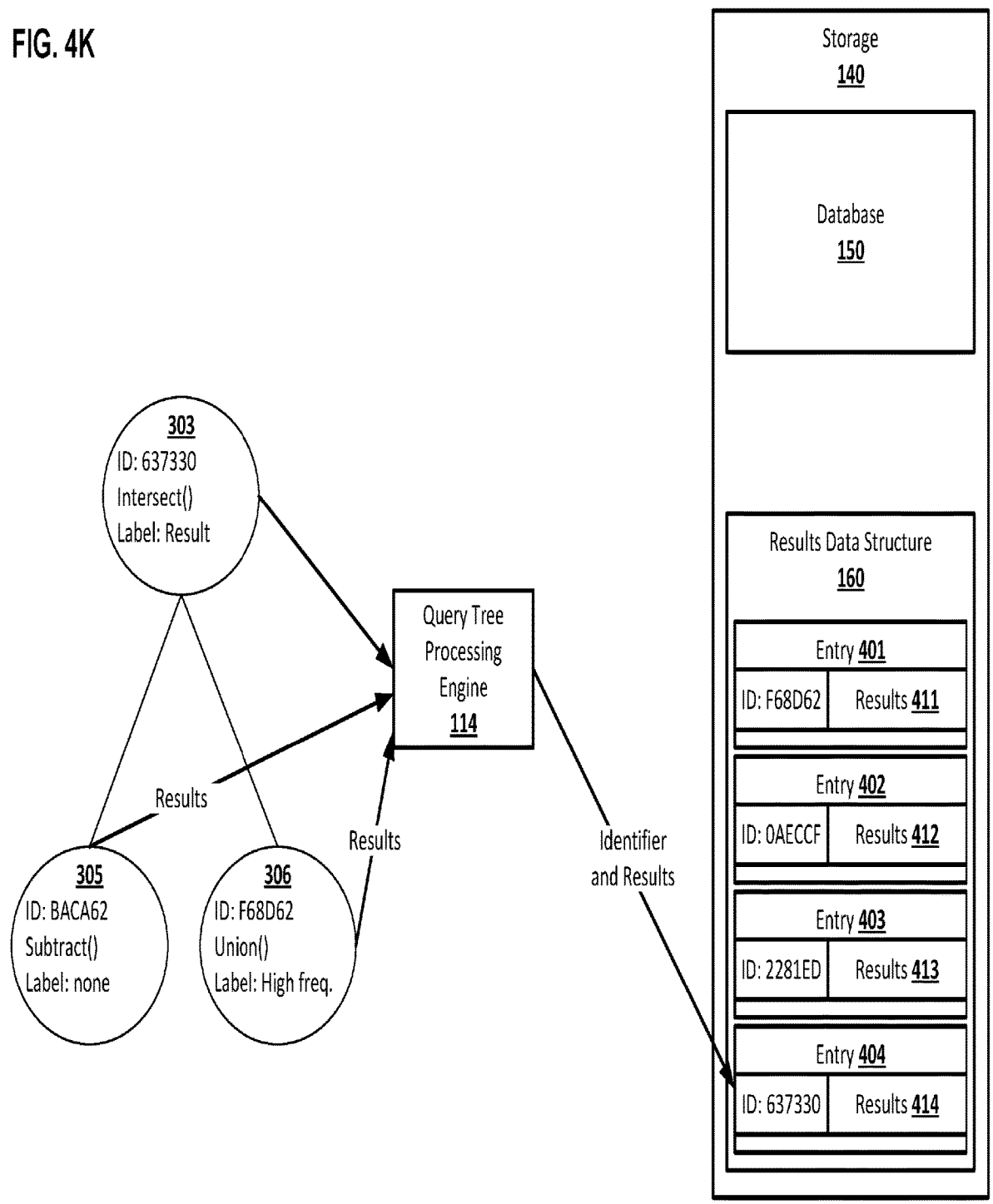
FIG. 4K shows an example arrangement suitable for query tree labeling and processing according to an implementation of the disclosed subject matter.

FIG. 4K shows an example arrangement suitable for query tree labeling and processing according to an implementation of the disclosed subject matter. The query tree processing engine 114, having determined that there is no entry in the results data structure 160 with the same identifier as the operation node 303, may process the operation node 303 to generate results for the operation node 303. The query tree processing engine 114 may perform the intersect operation represented by the operation node 303 on the values of the child nodes of the operation nodes 303, the operation nodes 305 and 306. The query tree processing engine 114 may perform the intersect operation on the values of the operation nodes 305 and 306, which may be returned upwards from the processing of the operation nodes 305 and 306.

The operation node 303 may have a label indicating that it is a node of interest, for example, a results node. This may cause the query processing engine 114 to store the results of processing the operation node 303 in the results data structure 160. For example, the query processing engine 114 may store an entry 404 in the results data structure 160. The entry 404 may include a results pair of the identifier of the operation node 303 and results 414 generated by the processing of the operation node 303, for example, the performance of the intersect operation on the values of the operation nodes 305 and 306.

Figure 4L:
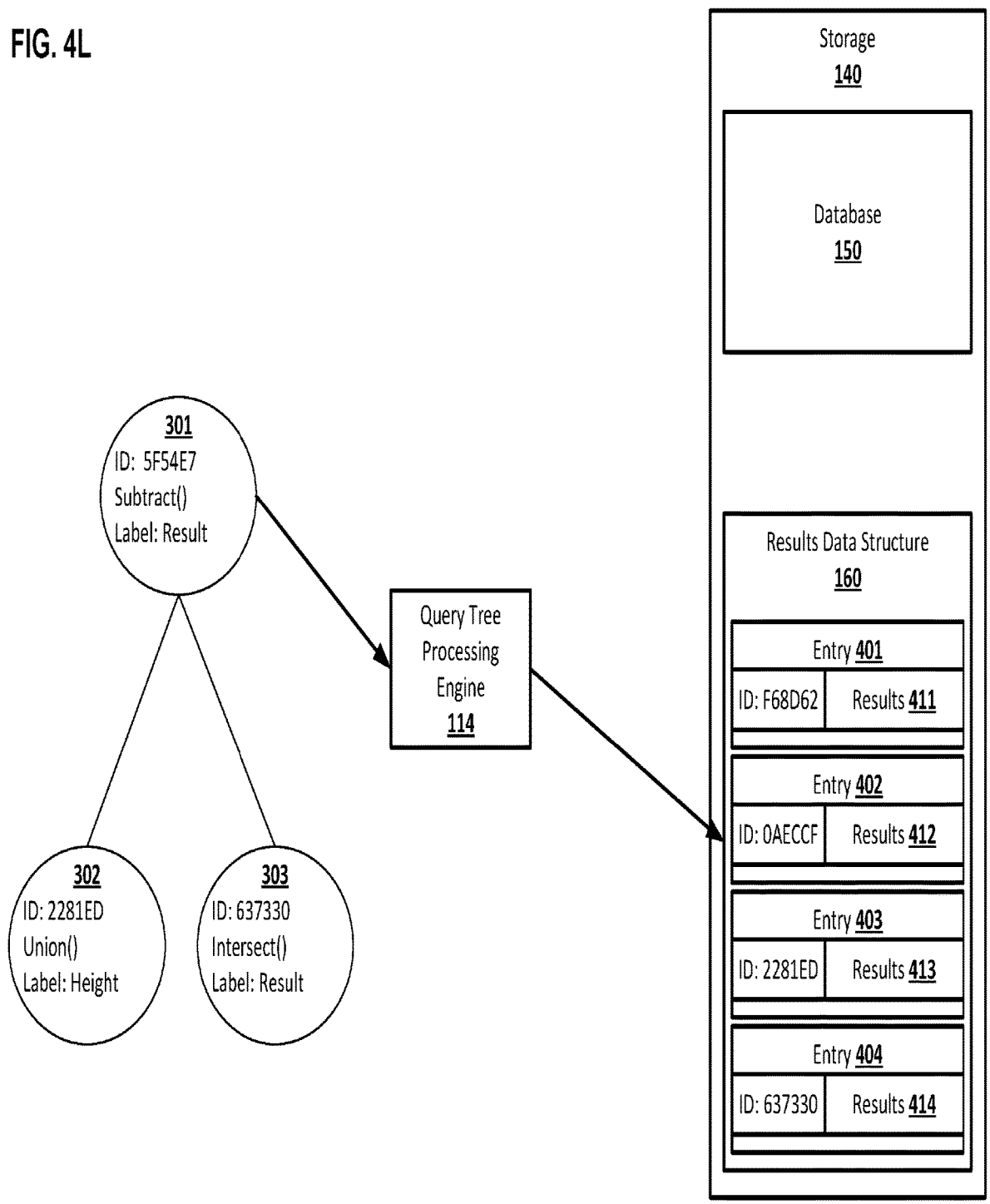
FIG. 4L shows an example arrangement suitable for query tree labeling and processing according to an implementation of the disclosed subject matter.

FIG. 4L shows an example arrangement suitable for query tree labeling and processing according to an implementation of the disclosed subject matter. After processing the operation node 303, the query tree processing engine 114 may continue the depth-first processing of the labeled query tree 300 by processing the operation node 301. The query tree processing engine 114 may first check the results data structure 160 to determine if there is an entry in the results data structure 160 with the same identifier as the operation node 301, and may determine that there is no such entry in the results data structure 160.

Figure 4M:
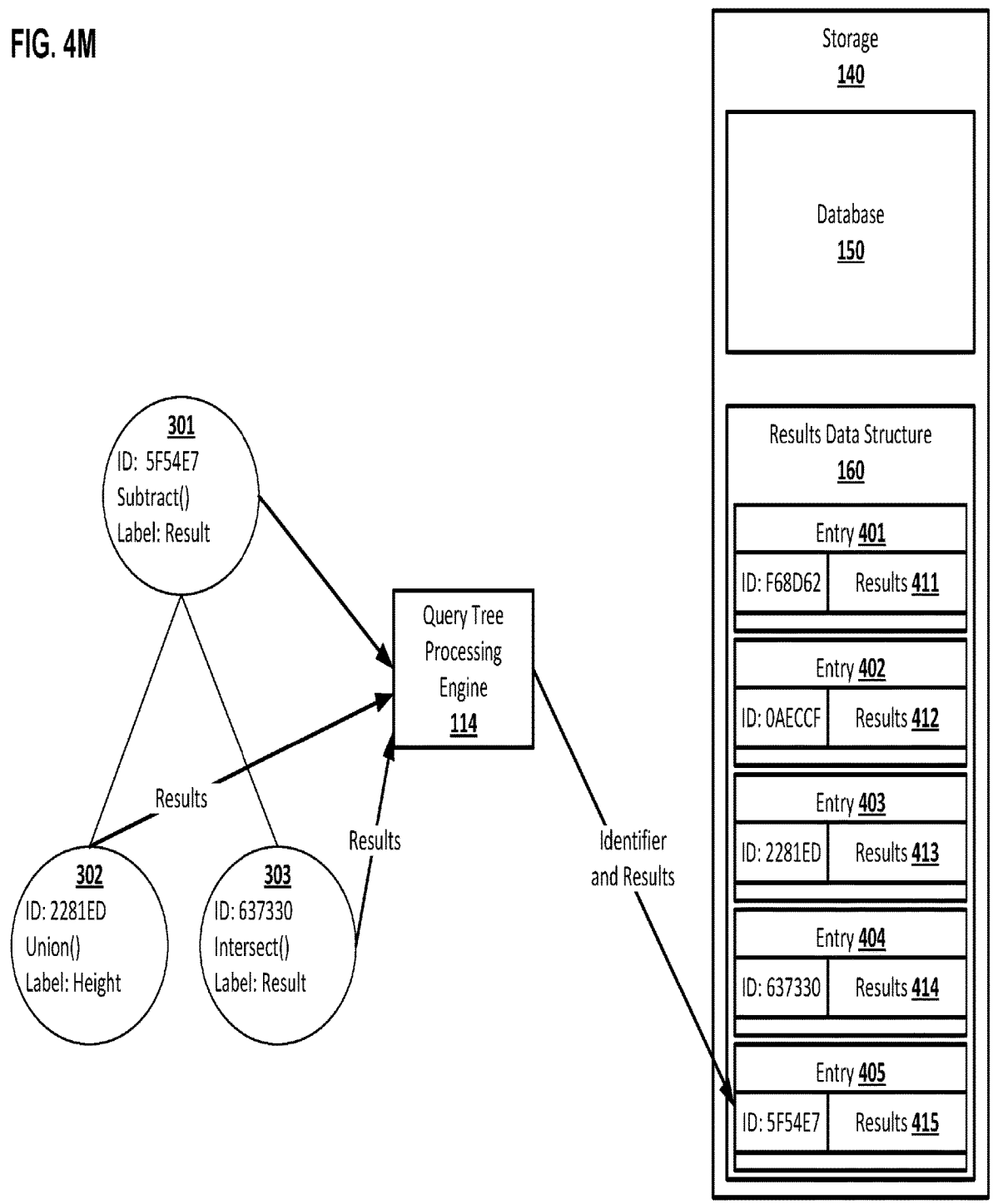
FIG. 4M shows an example arrangement suitable for query tree labeling and processing according to an implementation of the disclosed subject matter.

FIG. 4M shows an example arrangement suitable for query tree labeling and processing according to an implementation of the disclosed subject matter. The query tree processing engine 114, having determined that there is no entry in the results data structure 160 with the same identifier as the operation node 301, may process the operation node 301 to generate results for the operation node 301. The query tree processing engine 114 may perform the subtract operation represented by the operation node 301 on the values of the child nodes of the operation nodes 301, the operation nodes 302 and 303. The query tree processing engine 114 may perform the subtract operation on the values of the operation nodes 302 and 303, which may be returned upwards from the processing of the operation nodes 302 and 303.

The operation node 301 may have a label indicating that it is a node of interest, for example, a results node. This may cause the query processing engine 114 to store the results of processing the operation node 301 in the results data structure 160. For example, the query processing engine 114 may store an entry 405 in the results data structure 160. The entry 405 may include a results pair of the identifier of the operation node 301 and results 415 generated by the processing of the operation node 301, for example, the performance of the subtract operation on the values of the operation nodes 302 and 303.

The operation node 301 may be the root node of the labeled query tree 300. After processing the operation node 301, the query tree processing engine 114 may return results of processing the labeled query tree 300. The returned results may include, for example, results for any of the operation nodes that were labeled as results node. For example, the operation node 301, being the root node, may be labeled a results node, and the query tree processing engine 114 may return the results from processing the operation node 301. The query tree processing engine 114 may return the results from processing the operation node 301 from volatile memory, for example, in the same manner results are passed upwards when processing the labeled query tree 300, or may return the results 415 from the entry 405 in the results data structure 160. The operation node 303 may also be labeled a results node, and the query processing engine 114 may return the results from processing the operation node 303. The query tree processing engine 114 may return the results from processing the operation node 303 from volatile memory if they are still stored there, or from the entry 404 in the results data structure 160.

The results 411, 412, 413, 414, and 415 in the entries 401, 402, 403, 404, and 405 in the results data structure 160 may remain in the storage 140 after the query tree processing engine 114 has finished processing and returning results for the query tree processing engine 114. The results data structure 160 may be stored in non-volatile memory of the storage 140. If the results data structure 160 was stored in volatile memory of the storage 140 during the processing of the labeled query tree 300, the results data structure 160 may be copied or moved to non-volatile memory of the storage 140. The results data structure 160 may be stored in non-volatile memory of the results data structure 160 for any suitable amount of time, and may be used in any suitable manner, including, for example, being moved, copied, added to a databased, or divided smaller data structures. For example, the results data structure 160 may be accessed at a later time to retrieve any of the results 411, 412, 413, 414, and 415. The results data structure 160 may be searched by identifier to retrieve any of the results 411, 412, 413, 414, and 415, or may be accessed in any other suitable manner. For example, a visualization of the labeled query tree 300 may be displayed to a user, who may use a user interface to select a node of the labeled query tree 300 that was a node of interest. The results for the selected node of interest may be retrieved from the results data structure 160 and displayed to the user. The results data structure 160 may also be used in the processing of later labeled query trees, which may allow for the avoidance of computation on nodes in a new labeled query tree that have same identifier, and therefore produce the same results as, labeled nodes from the labeled query tree 300.

Figure 5:
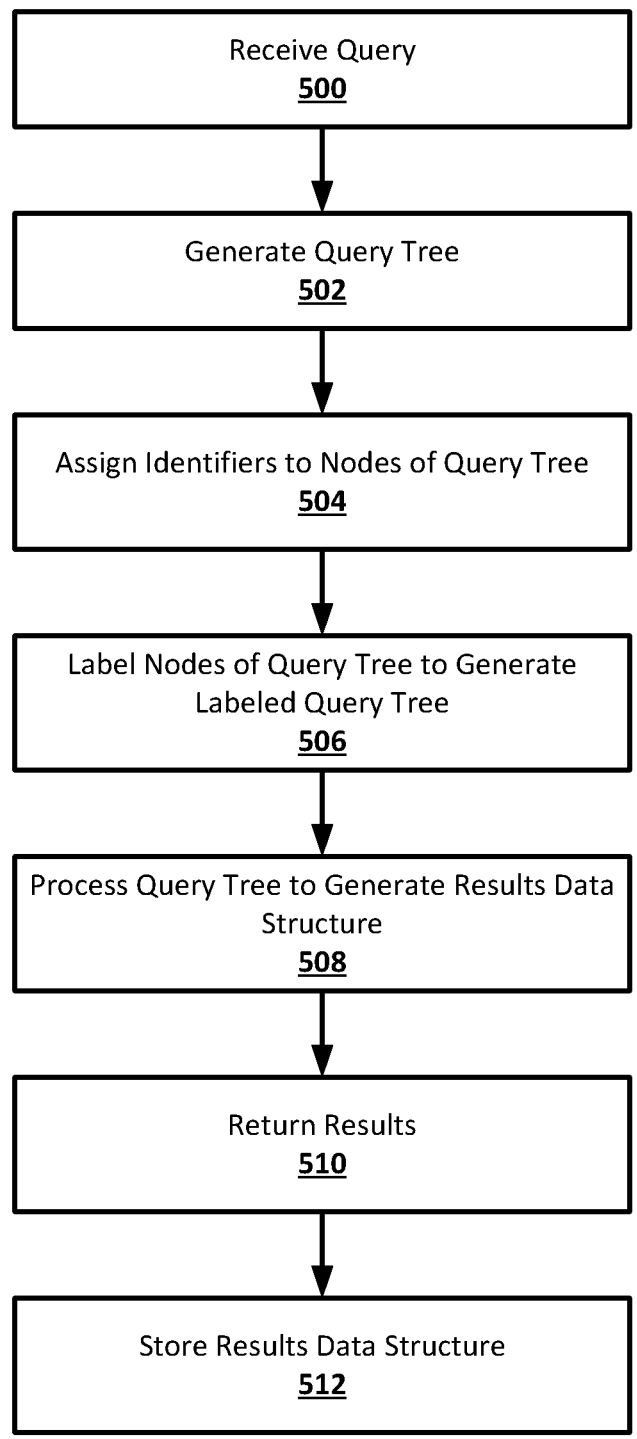
FIG. 5 shows an example procedure suitable for query tree labeling and processing according to an implementation of the disclosed subject matter.

FIG. 5 shows an example procedure suitable for query tree labeling and processing according to an implementation of the disclosed subject matter. At 500, a query may be received. For example, a query to be run against the database 150 may be received at the database server engine 110 of the computing device 100. The query may be in any suitable format, may use any suitable language compatible with the database server engine 110, and may be received from any suitable source, including other components of the computing device 100 or computing devices other than the computing device 100.

At 502, a query tree may be generated. For example, the query tree labeler 112 of the database server engine 110 may use the received query to generate a directed acyclic graph, or query tree, representing the elements of the query. The leaf nodes of the query tree may be static nodes representing data from the query and non-leaf nodes may be operation nodes, representing operations from the query. The query tree may be balanced in any suitable manner, and may, for example, be generated to minimize height differentials among the branches of the query tree. The query tree may be a directed acyclic graph, as the query tree may include child nodes that are the child of more than one node.

At 504, identifiers may be assigned to nodes of the query tree. For example, the query tree labeler 112 may generate and assign an identifier to each node of the query tree generated from the query. The identifiers may be generated using, for example, semantic or content hashes, and may be generated using the same rules for nodes of the same type to maintain consistency among identifiers generated for nodes that have the same properties. The identifiers may be generated so that nodes assigned the same identifier may always produce the same results when processed, and nodes that produce different results when processed may never be assigned the same identifier. The identifier for a leaf node may, for example, be based on the value of the leaf node or the reference to the value of the leaf node. For example, the identifier for the leaf node 307 may be based on the value of the data found in table 1 of the database 150 in rows 1 to 5 of column 5, or may be based on the reference "Table 1, col. 5, 1:5", represented, for example, as a string. The identifier for an operation node may, for example, be based on the operation represented by the node and properties of the children of the node. For example, the identifier for the operation node 305 may be based on the subtract operation represented by the node and any properties, including value, identifier, and operation, of the leaf node 309 and the operation node 310. Identifiers assigned to nodes may be stored in the data structures for the nodes.

At 506, nodes of the query tree may be labeled to generate a labeled query tree. For example, the query tree labeler 112 may generate the labeled query tree 300 by labeling nodes of interest in the query tree generated from the query received at the computing device. The query tree labeler 112 may label nodes of the query tree at any suitable time. For example, the query tree labeler 112 may label nodes after the query tree has been generated and nodes have been assigned identifiers, or concurrently with generating the query tree or generating and assigning identifiers to the nodes. The query tree labeler 112 may use any suitable criteria in determining which nodes of the query tree to label, and may label any nodes that meet any of the criteria. For example, the root node and nodes specified in the query, or otherwise specified, for example, through user input, as results nodes may be labeled as results nodes. Nodes with an identifier that is also assigned to a number of other nodes in the query tree higher than a threshold value for high frequency nodes may be labeled for being high frequency nodes. Nodes with a number of children greater than a threshold value for child nodes may be labeled for being nodes with many children. Nodes that are at or above a specified height in the query tree, having a number of generations below them that is greater than a threshold value for generations below a node may be labeled for being nodes at or above a specified height in the query tree. The label for a node may be stored in the data structure of the node, and may indicate the reason the node was labeled, or may be a generic indicator that the node is a node of interest. Nodes labeled as results nodes may be identified even if generic indicators are used so that the appropriate results from the results data structure 160 may be returned after the labeled query tree 300 is processed.

At 508, the labeled query tree may be processed to generate a results data structure. For example, the query tree processing engine 114 may process the labeled query tree 300, generating results for the nodes of the labeled query tree 300, effectively running the received query against the database 150. The query tree processing engine 114 may process the labeled query tree 300 in any suitable manner. For example, the query tree processing engine 114 may process the labeled query tree 300 depth-first. When processing an operation node, before performing computations for the operation of the operation node, the query tree processing engine 114 may check the results data structure 160 to determine if an entry exists with the same identifier as the operation node, and if so, the query tree processing engine 114 may use the results from that entry instead of performing computation to process the node. Otherwise, the query tree processing engine 114 may process the node by performing computation for the operation represented by the node on the values of the child nodes of the node, and, if the node is a labeled node, may store the identifier of the node and the results of processing the node in the results data structure 160. The query tree processing engine 114 may process every node in the labeled query tree 300.

At 510, results may be returned. For example, the query tree processing engine 114 may return results of processing the labeled query tree 300 to the source of the received query, for example another component of the computing device 100 or another computer device. The returned results may, for example, be displayed to a user, or may be used as input to another process executing on the computing device 100 or on another computing device. The results returned by the query tree processing engine 114 may include the results of processing the root node, which may be the results of the received query, along with the results of any nodes that were labeled results nodes. The results of nodes labeled as results nodes may be returned from the results data structure 160 if, for example, these results are no longer in volatile memory used to temporarily hold results during the processing of the labeled query tree 300.

At 512, the results data structure may be stored. The results data structure 160 may store entries of results pairs, with identifiers and results, for all of the labeled nodes in the labeled query tree 300. The results data structure 160 may be stored in non-volatile memory of the storage 140 after the query tree processing engine 114 has completed processing the labeled query tree 300. The results data structure 160 may remain stored for any suitable length of time, including after the labeled query tree 300 has been discarded from volatile memory, and may be copied, moved, and otherwise treated as a stored data structure independent of the labeled query tree 300. The results data structure 160 may be accessed at any time to retrieve results from the entries, for example, when the query tree processing engine 114 is processing another labeled query tree.

Figure 6:
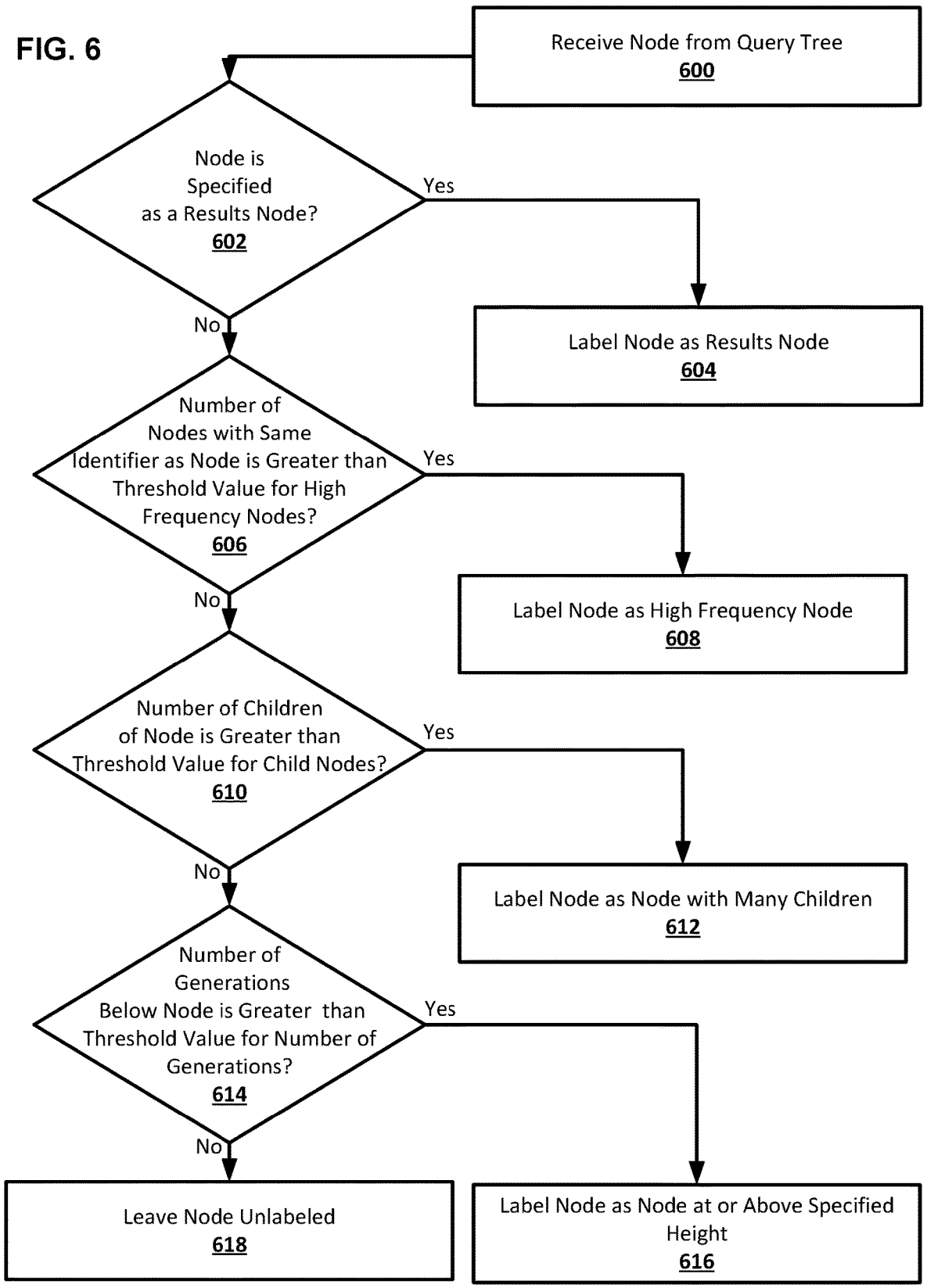
FIG. 6 shows an example procedure suitable for query tree labeling and processing according to an implementation of the disclosed subject matter.

FIG. 6 shows an example procedure suitable for query tree labeling and processing according to an implementation of the disclosed subject matter. At 600, a node may be received. For example, the query tree labeler 112 may receive a node of query tree generated from a received query after the query tree is generated, for example, by the query tree labeler 112.

At 602, if the node is specified as a results node, flow may proceed to 604, otherwise, flow may proceed to 606. A node may be specified as a results node in any suitable manner. Fore example, the root node of a query tree may always be specified as a results node. The query used to generate the query tree may specify operations whose representative operation nodes may be results nodes. A user may provide input based on the generated query tree to specify nodes of the query tree as results node. For example, the operation node 303 may be labeled a results node based on the received query specifying that intersect operation represented by the operation node 303 is a results node.

At 604, the node may be labeled as a results node. For example, the query tree labeler 112 may label the node, for example, the operation node 303, as a results node by storing the label, or another indicator thereof, in the data structure of the node.

At 606, if the number of nodes with the same identifier as the node is greater than a threshold value for high frequency nodes, flow may proceed to 608, otherwise flow may proceed to 610. Multiple nodes in the same query tree may be assigned the same identifier. If the number of nodes with same identifier exceeds a threshold value, those node may be labeled as high frequency nodes. For example, the operation nodes 304 and 306 may be assigned the same identifier, indicating that they will produce the same results when processed. If the threshold value for high frequency nodes is one, the operation nodes 304 and 306 may both exceed the threshold value.

At 608, the node may be labeled as a high frequency node. For example, the query tree labeler 112 may label the node, for example, the operation node 304, as a high frequency node by storing the label, or another indicator thereof, in the data structure of the node. The label may also be a generic label instead of a label that indicates that node was labeled because it is high frequency node.

At 610, if the number of children of the node is greater than a threshold value child nodes, flow may proceed to 612, otherwise flow may proceed to 614. If a node has a number of child nodes that exceeds a threshold value for child nodes, that node may be labeled as a node with many children. For example, the operation node 310 may have three children, the leaf nodes 311, 312, and 313. If the threshold value for the number of child nodes is two, the operation node 310 may exceed the threshold value.

At 612, the node may be labeled as a node with many children. For example, the query tree labeler 112 may label the node, for example, the operation node 310, as a node with many children, by storing the label, or another indicator thereof, in the data structure of the node. The label may also be a generic label instead of a label that indicates that node was labeled because it is a node with many children.

At 614, if the number of generations below a node is greater than a threshold value for number of generations below a node, flow may proceed to 616, otherwise flow may proceed to 618. If a node has a number of generations below it that exceeds that exceeds a threshold value for the number of generations below a node, that node may be labeled as a node at or above a specified height. For example, the operation nodes 302 and 303 may have three generations below them. If the threshold value for the number generations below a node is two, the operation nodes 302 and 303 may exceed the threshold value.

At 616, the node may be labeled as a node at or above a specified height. For example, the query tree labeler 112 may label the node, for example, the operation node 302, as a node at or above a specified height, by storing the label, or another indicator thereof, in the data structure of the node. The label may also be a generic label instead of a label that indicates that node was labeled because it is a node at or above a specified height. Because the operation node 303 may have already been labeled as a results node, the operation node 303 may not be labeled as a node at or above a specified height, as nodes may only need a single label and the results node label may supersede all other labels.

Figure 7:
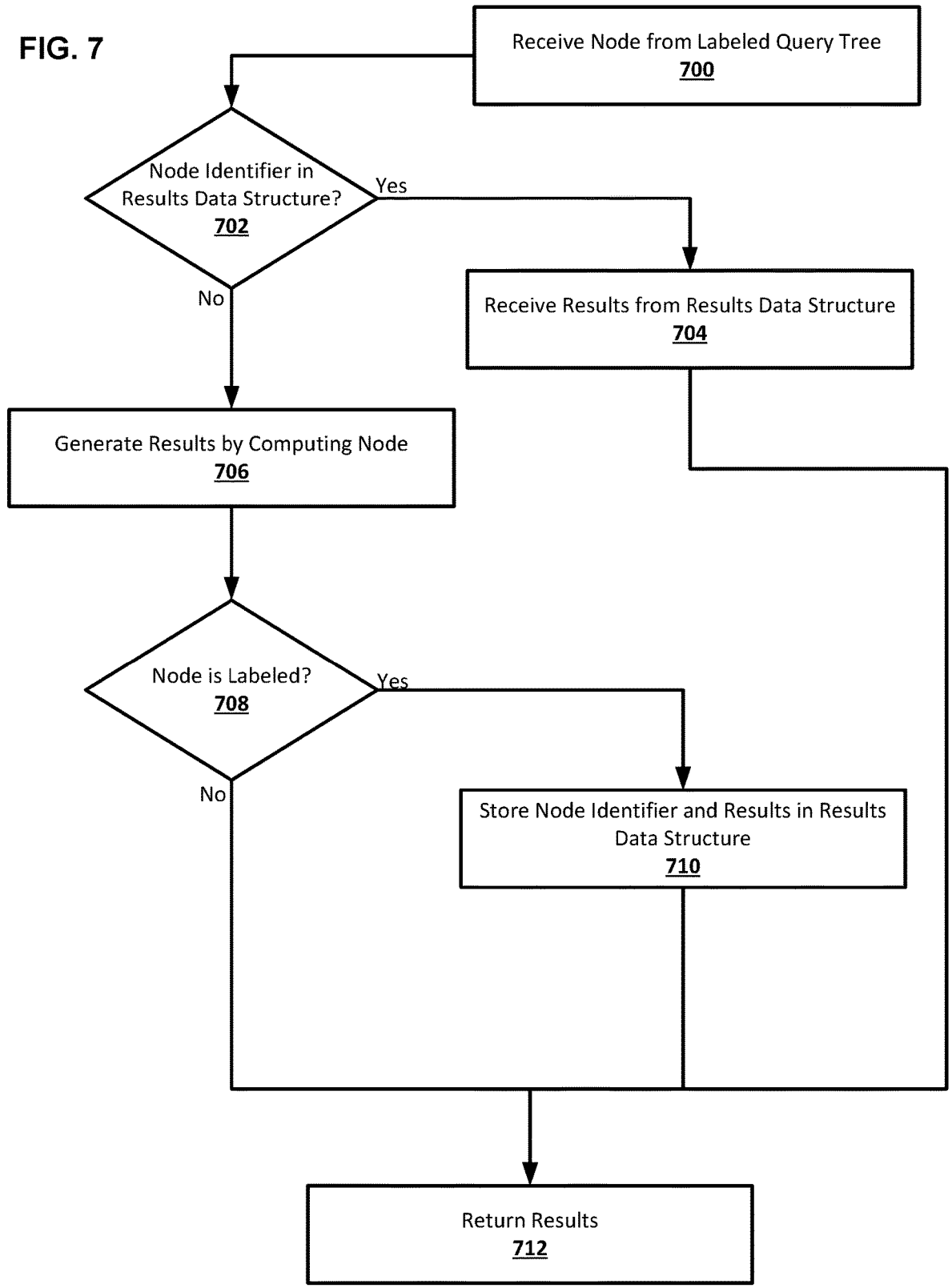
FIG. 7 shows an example procedure suitable for query tree labeling and processing according to an implementation of the disclosed subject matter.

At 618, the node may be left unlabeled. For example, if the query tree labeler 112 determines that the node does not meet any of the criteria for being labeled as a node of interest, the node may not be labeled FIG. 7 shows an example procedure suitable for query tree labeling and processing according to an implementation of the disclosed subject matter. At 700, a node may be received. For example, the query processing engine 114 may receive a node of labeled query tree, such as the labeled query tree 300, generated from a received query by the query tree labeler 112.

At 702, if an identifier for the node is found in a results data structure, flow may proceed to 704. Otherwise, flow may proceed to 706. The query tree processing engine 114 may, before performing any computation to generate results for a node based on the operation represented by the node and the values of the child nodes of the node, check the results data structure 160 to determine if the identifier for the node is already in an entry in the results data structure 160. If the identifier for the node is found in the results data structure 160, this may indicate that the query tree processing engine 114 has previously processed a node that generates the same results as the node whose identifier was found in the results data structure 160. In some implementations, the query tree processing engine 114 may not check the results data structure 160 when processing an unlabeled node, as nodes that do not have labels may not have the same identifier as any node that is labeled and has its results stored in the results data structure 160.

At 704, results may be received from the results data structure. For example, the query tree processing engine 114 may have found the identifier for the node in the results data structure 160, for example, finding the identifier for the operation node 306 in the entry 401 of the results data structure 160, as the entry 401 may have an identifier that matches the identifier of the operation node 306. The query tree processing engine 114 may receive the results 411 from the entry 401, and may use the results 411 as the results of processing the operation node 306. The query tree processing engine 114 may not perform computations based on the operation represented by the operation node 306 and the values of the leaf nodes 307 and 308 to generate results for the operation node 306, using the results 411 instead.

At 706, results may be generated by computing the node. For example, the query tree processing engine 114 may not have found the identifier for the node in the results data structure 160, for example, not finding the identifier for the operation node 304 in any entry of the results data structure 160. The query tree processing engine 114 may generate results for the node by performing computations based on the operation represented by the node and the values of the child nodes of the nodes, for example, performing the union operation represented by the operation node 304 with the values of the leaf nodes 307 and 308. In computing a node, the query tree processing engine 114 may access a database, such as the database 150, to access data for the value of a node that includes a reference to the database.

At 708, if the node is labeled, flow may proceed to 710. Otherwise, flow may proceed to 712. Some of the nodes in the labeled query tree 300 may have been labeled by the query tree labeler 112, while other nodes may not have labels. Nodes with labels may have their results stored in the results data structure 160, while nodes with not labels may not have their results stored in the results data structure 160.

At 710, the identifier for the node and the results for the node may be stored in the results data structure. For example, the query tree processing engine 114 may have determine that the node, for example, the operation node 304, did not have its identifier already stored in the results data structure 160, and is a labeled node. The query tree processing engine 114 may store the results generated for the node and the node identifier in an entry in the results data structure 160, for example, storing the identifier for the node 304 and the results 411 of computing the union operation represented by the operation node 304 using the values of the leaf nodes 307 and 308 and the operation node 310 as the entry 401.

At 712, the results may be returned. For example, the query tree processing engine 114 may return the results of processing the node, whether through computing the node or receiving the results from the results data structure 160. The results may be returned upwards to be used when processing a parent node of the node in the labeled query tree 300, or, if the node is the root node of the labeled query tree 300, the results may be returned to the source of the query used to generate the labeled query tree 300, for example, another component of the computing device 100 or a different computing device.

Figure 8:
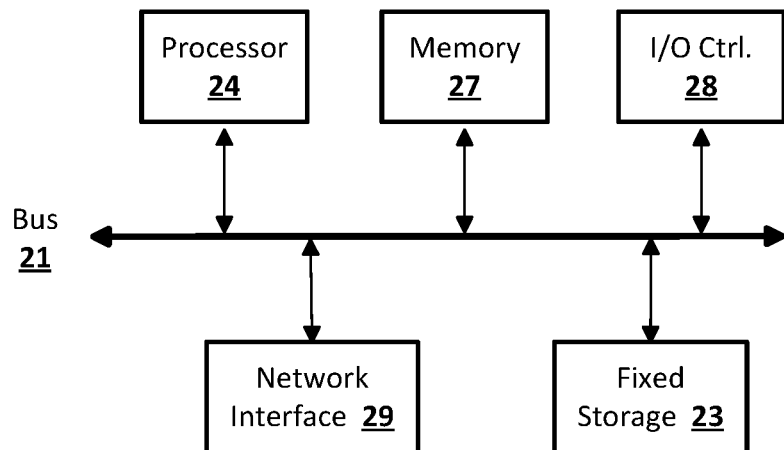
FIG. 8 shows a computer according to an embodiment of the disclosed subject matter.

Embodiments of the presently disclosed subject matter may be implemented in and used with a variety of component and network architectures. FIG. 8 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 9.

Many other devices or components (not shown) may be connected in a similar manner, such as document scanners, digital cameras, auxiliary, supplemental, or backup systems, or the like. Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 9:
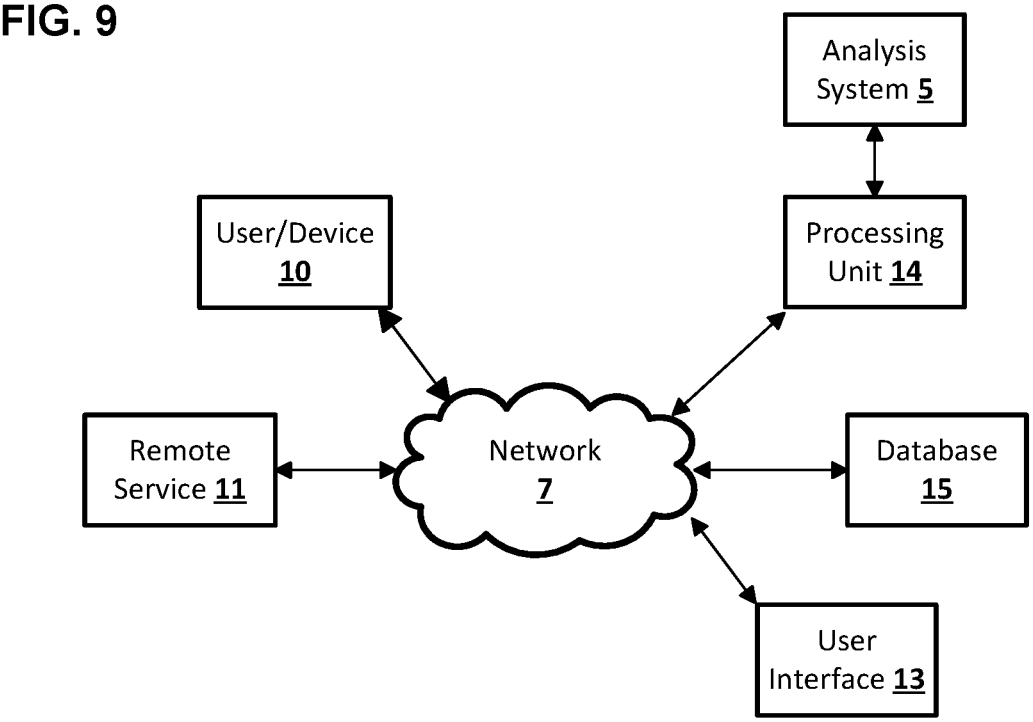
FIG. 9 shows a network configuration according to an embodiment of the disclosed subj ect matter.

FIG. 9 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database table 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database table 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database table 15 and/or user interface 13. In some arrangements, an analysis system 5 may provide back-end processing, such as where stored or acquired data is pre-processed by the analysis system 5 before delivery to the processing unit 14, database table 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
receiving, at a database server engine on a computing device, a query;
generating, by the database server engine on the computing device, a query tree from the query, wherein the query tree comprises nodes, wherein at least two of the nodes are operation nodes;
generating, by the database server engine on the computing device, a respective identifier for each respective node of the nodes of the query tree;
storing, by the database server engine on the computing device, each respective identifier in the respective node of the nodes of the query tree for which each respective identifier was generated;
determining, by the database server engine on the computing device, one or more of the nodes of the query tree that meet at least one criteria for being labeled nodes, wherein a first of the at least one criteria for being a labeled node comprises having a number of child nodes greater than a threshold value for child nodes, and wherein at least one of the one or more nodes of the query tree meets the first of the at least one criteria;
storing, by the database server engine on the computing device, labels in the one or more of the nodes of the query tree determined to meet at least one criteria for being labeled nodes to generate a labeled query tree comprising all of the nodes of the query tree;
processing, by the database server engine on the computing device, the labeled query tree by, for each respective node of the labeled query tree:
determining whether the respective identifier stored in the respective node matches any identifier for any entry in a results data structure, and either:
if the respective identifier stored in the respective node matches any identifier for any entry in the results data structure, receiving results from an entry in the results data structure with the identifier that matches the respective identifier stored in the respective node and returning the results from the entry as the results for the respective node, or,
if the respective identifier stored in the respective node does not match any identifier for any entry in the results data structure:
generating new results for the respective node by computing the respective node,
if the respective node has a label, storing a new entry in the results data structure comprising the new results for the respective node and the respective identifier stored in the respective node,
if the respective node does not have a label, not storing the new entry in the results data structure, and
returning the new results for the respective node; and
storing the results data structure.

2. The method of claim 1, wherein the storing the results data structure comprises storing the results data structure in non-volatile memory.

3. The method of claim 1, wherein the criteria for nodes of the query tree being labeled nodes comprise one or more of:
being a results node by being either a root node of the query tree or being specified as a results node,
being a node at or above a specified height by having a number of generations below that is greater than a threshold value for generation below a node.

4. The method of claim 1, wherein one or more of the nodes of the labeled query tree are labeled as results nodes, and further comprising returning final results comprising the results or the new results from the one or more of the nodes of the labeled query tree that are labeled as results nodes to a source of the query that was received at the database server engine on the computing device.

5. The method of claim 1, wherein, after all of the nodes of the labeled query tree are processed, the results data structure comprises a separate entry for each respective node of the labeled query tree that is labeled and has the new results that were generated by computing the respective node, and wherein each entry in the results data structure comprises a respective identifier different from all other identifiers in the results data structure.

6. The method of claim 1, wherein generating, by the database server engine on the computing device, a respective identifier for each respective nodes of the nodes of the query tree further comprises generating the each respective identifier for the each respective node of the nodes of the query tree such that:
for any two nodes of the query tree for which the generated respective identifier for each respective node of the two nodes is the same, the two nodes will produce the same results when computed; and
for any other two nodes for which the generated respective identifier for each respective node of the two other nodes is different, the other two nodes will produce different results when computed.

7. The method of claim 1, wherein generating, by the database server engine on the computing device, identifiers for the nodes of the query tree comprises using at least one of a content hash and a semantic hash.

8. The method of claim 1, further comprising:
discarding the labeled query tree; and
accessing the results or the new results for at least one respective node of the discarded labeled query tree that was labeled from the results data structure.

9. A computer-implemented system comprising:
a storage, and
a processor that receives a query,
generates a query tree from the query, wherein the query tree comprises nodes, wherein at least two of the nodes are operation nodes;
generates a respective identifier for each respective node of the nodes of the query tree;
stores each respective identifier in the respective node of the nodes of the query tree for which each respective identifier was generated;
determines one or more of the nodes of the query tree that meet at least one criteria for being labeled nodes, wherein a first of the at least one criteria for being a labeled node comprises having a number of child nodes greater than a threshold value for child nodes, and wherein at least one of the one or more nodes of the query tree meets the first of the at least one criteria;
stores labels in the one or more of the nodes of the query tree determined to meet at least one criteria for being labeled nodes to generate a labeled query tree comprising all of the nodes of the query tree;
processes the labeled query tree by, for each respective node of the labeled query tree:

determining whether the respective identifier stored in the respective node matches any identifier for any entry in a results data structure, and either:
if the respective identifier of the respective node matches any identifier for any entry in the results data structure, receiving results from the entry in the results data structure with the identifier that matches the respective identifier stored in the respective node and returning the results from the entry as the results for the respective node, or,
if the respective identifier stored in the respective node does not match any identifier for any entry in the results data structure:
generating new results for the respective node by computing the respective node,
if the respective node has a label, storing a new entry in the results data structure comprising the new results for the respective node and the respective identifier stored in the respective node,
if the respective node does not have a label, not storing the new entry in the results data structure, and
returning the new results for the respective node; and storing the results data structure.

10. The system of claim 9, wherein the processors stores the results data structure by storing the results data structure in non-volatile memory of the storage.

11. The system of claim 9,
wherein the criteria for nodes of the query tree being labeled nodes comprise one or more of:
being a results node by being either a root node of the query tree or being specified as a results node, and
being a node at or above a specified height by having a number of generations below that is greater than a threshold value for generation below a node.

12. The system of claim 9, wherein one or more of the nodes of the labeled query tree are labeled as results nodes, and wherein the processor returns final results comprising the results or the new results from the one or more of the nodes of the labeled query tree that are labeled as results nodes to a source of the query that was received at the database server engine on the computing device.

13. The system of claim 9, wherein, after all of the nodes of the labeled query tree are processed, the results data structure comprises a separate entry for each respective node of the labeled query tree that is labeled and has the new results that were generated by computing the respective node, and wherein each entry in the results data structure comprises a respective identifier different from all other identifiers in the results data structure.

14. The system of claim 9, wherein the processor generates a respective identifier for each respective node of the nodes of the query tree further by generating the each respective identifier for the each respective node of the nodes of the query tree such that:
for any two nodes of the query tree for which the generated respective identifier for each respective node of the two nodes is the same, the two nodes will produce the same results when computed; and
for any other two nodes for which the generated respective identifier for each respective node of the two other nodes is different, the other two nodes will produce different results when computed.

15. The system of claim 9, wherein the processor generates identifiers for the nodes of the query tree by using at least one of a content hash and a semantic hash.

16. The system of claim 9, wherein the processor further discards the labeled query tree and accesses the results or the new results for at least one respective node of the discarded labeled query tree that was labeled from the results data structure.

17. A system comprising: one or more computers and one or more storage devices storing instructions which are operable, when executed by the one or more computers, to cause the one or more computers to perform operations comprising:
comprising:
receiving, at a database server engine on a computing device, a query;
generating, by the database server engine on the computing device, a query tree from the query, wherein the query tree comprises nodes, wherein at least two of the nodes are operation nodes;
generating, by the database server engine on the computing device, a respective identifier for each respective node of the nodes of the query tree;
storing, by the database server engine on the computing device, each respective identifier in the respective node of the nodes of the query tree for which each respective identifier was generated;
determining, by the database server engine on the computing device, one or more of the nodes of the query tree that meet at least one criteria for being labeled nodes, wherein a first of the at least one criteria for being a labeled node comprises having a number of child nodes greater than a threshold value for child nodes, and wherein at least one of the one or more nodes of the query tree meets the first of the at least one criteria;
storing, by the database server engine on the computing device, labels in the one or more of the nodes of the query tree determined to meet at least one criteria for being labeled nodes to generate a labeled query tree comprising all of the nodes of the query tree;
processing, by the database server engine on the computing device, the labeled query tree by, for each respective node of the labeled query tree:
determining whether the respective identifier stored in the respective node matches any identifier for any entry in a results data structure, and either:
if the respective identifier stored in the respective node matches any identifier for any entry in the results data structure, receiving results from an entry in the results data structure with the identifier that matches the respective identifier stored in the respective node and returning the results from the entry as the results for the respective node, or,
if the respective identifier stored in the respective node does not match any identifier for any entry in the results data structure:
generating new results for the respective node by computing the respective node,
if the respective node has a label, storing a new entry in the results data structure comprising the new results for the respective node and the respective identifier stored in the respective node,
if the respective node does not have a label, not storing the new entry in the results data structure, and
returning the new results for the respective node; and
storing the results data structure.

18. The system of claim 17, wherein the criteria for nodes of the query tree being labeled nodes comprise one or more of:
- being a results node by being either a root node of the query tree or being specified as a results node,
- being a node at or above a specified height by having a number of generations below that is greater than a threshold value for generation below a node.

* * * * *